US012772125B2

(12) United States Patent
Zhang et al.

(10) Patent No.: US 12,772,125 B2
(45) Date of Patent: Oct. 20, 2026

(54) COMMUNICATION METHOD AND APPARATUS FOR SWITCHING BANDWIDTH PARTS

(71) Applicant: HUAWEI TECHNOLOGIES CO., LTD., Shenzhen (CN)

(72) Inventors: Yunhao Zhang, Shanghai (CN); Xiuqiang Xu, Shanghai (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 619 days.

(21) Appl. No.: 18/163,898

(22) Filed: Feb. 3, 2023

(65) Prior Publication Data

US 2023/0189103 A1 Jun. 15, 2023

Related U.S. Application Data

(63) Continuation of application No. PCT/CN2021/109056, filed on Jul. 28, 2021.

(30) Foreign Application Priority Data

Aug. 7, 2020 (CN) ......................... 202010791444.7

(51) Int. Cl.
*H04W 36/06* (2009.01)
*H04W 72/0457* (2023.01)
(Continued)

(52) U.S. Cl.
CPC ....... *H04W 36/06* (2013.01); *H04W 72/0457* (2023.01); *H04W 72/1268* (2013.01); *H04W 72/23* (2023.01)

(58) Field of Classification Search
CPC ............. H04W 36/06; H04W 72/0457; H04W 72/1268; H04W 72/23; H04W 72/0453;
(Continued)

(56) References Cited

U.S. PATENT DOCUMENTS 12,369,138 B2 * 7/2025 Agiwal .................. H04L 5/001
2018/0279353 A1 * 9/2018 Shaheen ............... H04L 5/0053
(Continued)

FOREIGN PATENT DOCUMENTS

CN 110710272 A 1/2020
CN 110856276 A 2/2020
(Continued)

OTHER PUBLICATIONS

Spreadtrum Communications, Huawei, HiSilicon, LBT Failures Handling in Non-Connected State. 3GPP TSG-RAN WG2 Meeting #108, Reno, USA, Nov. 18-22, 2019, R2-1915015, 3 pages.
(Continued)

*Primary Examiner* — Afshawn M Towfighi
(74) *Attorney, Agent, or Firm* — HAUPTMAN HAM, LLP

(57) ABSTRACT

A communication method and an apparatus. A terminal device camps on a first BWP, where the terminal device is in a non-connected state. The terminal device receives a first message from a network device, where the first message is for indicating a second BWP; and the terminal device switches from the first BWP to the second BWP.

20 Claims, 9 Drawing Sheets

100

(51) Int. Cl.
*H04W 72/1268* (2023.01)
*H04W 72/23* (2023.01)

(58) Field of Classification Search
CPC .... H04W 72/04; H04W 76/27; H04L 5/0048; H04L 5/0044; H04L 5/0053; H04L 5/0055; H04L 5/001
See application file for complete search history.

(56) References Cited

U.S. PATENT DOCUMENTS

| | | | | |
|---|---|---|---|---|
| 2019/0182000 | A1 * | 6/2019 | Futaki | H04L 1/0693 |
| 2019/0305916 | A1 | 10/2019 | Liao | |
| 2019/0394776 | A1 | 12/2019 | Lee et al. | |
| 2020/0137718 | A1 | 4/2020 | Agiwal et al. | |
| 2020/0288474 | A1 * | 9/2020 | Park | H04W 72/0453 |
| 2021/0028853 | A1 * | 1/2021 | Wu | H04B 7/0626 |
| 2023/0171658 | A1 * | 6/2023 | Wen | H04B 7/06964 |
| 2023/0209526 | A1 * | 6/2023 | Li | H04W 72/0453 370/329 |

FOREIGN PATENT DOCUMENTS

| | | | |
|---|---|---|---|
| CN | 111194089 | A | 5/2020 |
| CN | 111436082 | A | 7/2020 |
| WO | 2020027601 | A1 | 2/2020 |

OTHER PUBLICATIONS

International Search Report issued in corresponding International Application No. PCT/CN2021/109056, dated Oct. 11, 2021, pp. 1-9.
India Office Action issued in corresponding India Application No. 202317008156, dated May 3, 2024, pp. 1-7.
Extended European Search Report issued in corresponding European Application No. 21852629.1, dated Nov. 9, 2023, pp. 1-8.

* cited by examiner

COMMUNICATION METHOD AND APPARATUS FOR SWITCHING BANDWIDTH PARTS

CROSS-REFERENCE TO RELATED APPLICATIONS

This application is a continuation of International Application No. PCT/CN2021/109056, filed on Jul. 28, 2021, which claims priority to Chinese Patent Application No. 202010791444.7, filed on Aug. 7, 2020. The disclosures of the aforementioned applications are hereby incorporated by reference in their entireties.

BACKGROUND

With the development of communication technologies, an increasingly wide spectrum can be used. A bandwidth of a single carrier in new radio (new radio, NR) is wide. For example, a bandwidth of a single carrier in NR may reach 100 MHz (megahertz). To flexibly use carrier resources, a bandwidth part (bandwidth part, BWP) is introduced in NR. A bandwidth of one BWP is less than or equal to a carrier bandwidth. After the BWP is introduced, how to configure a BWP for a terminal device becomes a subject worth studying.

SUMMARY

Embodiments described herein provide a communication method and an apparatus, to indicate a terminal device to perform BWP switching.

According to a first aspect, a communication method is provided. The method is performed by a terminal device, or is performed by a component (a chip, a circuit, or the like) configured in a terminal device, and the method includes: A terminal device camps on a first BWP, where the terminal device is in an RRC-non-connected state, and the RRC-non-connected state includes an RRC-idle state, an RRC-inactive state, or the like; the terminal device receives a first message from a network device, where the first message is for indicating a second BWP; and the terminal device switches from the first BWP to the second BWP.

By implementing the foregoing method, the BWP on which the terminal device in the non-connected state camps is switched, so that a problem of resource congestion of an initial BWP caused when all terminal devices in the non-connected state camp on the initial BWP is avoided.

In at least one embodiment, the first message is carried in DCI, and the DCI is first-type DCI, including DCI scrambled by a paging radio network temporary identifier P-RNTI or DCI scrambled by a system information radio network temporary identifier SI-RNTI; or the DCI is second-type DCI, including a physical downlink control channel PDCCH order (order), DCI scheduling a physical downlink shared channel (PDSCH), DCI scheduling a random access response, or DCI scheduling an acknowledgment ACK/negative acknowledgment NACK feedback for a configured grant CG. The DCI scheduling a PDSCH is DCI scheduling downlink small data. The downlink small data is carried in the PDSCH.

By implementing the foregoing method, an idle bit or a newly added bit in the DCI is used for indicating the non-connected terminal device to perform BWP switching, thereby avoiding the resource congestion of the initial BWP. Optionally, the first DCI is also referred to as multicast DCI, the second DCI is also referred to as unicast DCI, the multicast DCI is for carrying indication information for BWP switching of one or more terminal devices, and the unicast DCI is for carrying indication information for BWP switching of one terminal device.

In at least one embodiment, the first message is carried in a PDSCH, and the PDSCH is for carrying at least one of following information: information for paging, system information, a random access response, an ACK/NACK feedback for a CG, or downlink small data.

By implementing the foregoing method, for the terminal device in the non-connected state, a multicast PDSCH or a unicast PDSCH is used for indicating a parameter of BWP switching, thereby achieving a technical effect that the network device indicates the terminal device in the non-connected state to perform BWP switching. Optionally, the PDSCH includes a multicast PDSCH and a unicast PDSCH. The multicast PDSCH refers to a PDSCH sent to one or more terminal devices, and the unicast PDSCH refers to a PDSCH sent to a specific terminal device.

In at least one embodiment, the first message is for indicating at least one of following content: an identifier of the second BWP, information about a terminal device using BWP switching, a type of the terminal device using BWP switching, a BWP switch period, a cell corresponding to the second BWP, and a resource for small data communication in the second BWP. Optionally, the resource for small data communication is further described as a resource for transmitting a transmit block whose size is less than or equal to a first threshold (for example, R bits, where R is a positive integer), or a resource for transmitting a PDCCH, a PDSCH, and/or a PUSCH of a terminal device in an RRC-non-connected state.

By implementing the foregoing method, the information about a terminal device using BWP switching indicates some terminal devices in multicast to perform BWP switching, and the type of the terminal device using BWP switching indicate some types of terminal devices in multicast to perform BWP switching, for example, indicate only an REDCAP-type terminal device to perform BWP switching. The BWP switch period includes a BWP switching period, and indicate the terminal device to perform BWP switching within a current BWP switching period, or within N periods after the current period. The cell corresponding to the second BWP indicates a cell on which the terminal device camps after being switched to the second BWP. The resource for small data communication in the second BWP indicates a resource specifically for small data communication in the second BWP to the terminal device. In at least one embodiment, in addition to indicating the identifier of the second BWP, the first message further indicates other information, to provide communication between the terminal device and the network device.

In at least one embodiment, the method further includes: receiving a second message from a network device. The second message is for configuring one or more BWPs for the terminal device, and the one or more BWPs include the second BWP.

In at least one embodiment, the second message includes an RRC release message, system information, or a message carried in the PDSCH.

By implementing the foregoing method, one or more BWPs are preconfigured for the terminal device through the second message, and one of the BWPs, namely, the second BWP, is indicated to perform BWP switching through the first message, thereby reducing signaling overheads of the first message.

In at least one embodiment, the second message is for indicating at least one of following content in each of the one or more BWPs: an identifier of the BWP; a measurement parameter; the BWP switch period; use of the BWP for uplink and/or downlink transmission; and a time-frequency resource for small data transmission in the BWP. Optionally, the resource for small data communication is further described as a resource for transmitting a transmit block whose size is less than or equal to a first threshold (for example, R bits, where R is a positive integer), or a resource for transmitting a PDCCH, a PDSCH, and/or a PUSCH of a terminal device in an RRC-non-connected state.

By implementing the foregoing method, one or more BWPs are preconfigured for the terminal device through the second message, and each BWP includes a plurality of parameters, to provide communication between the network device and the terminal device.

In at least one embodiment, the first message is further for indicating at least one of following content in the second BWP: an identifier of the BWP; a measurement parameter; the BWP switch period; use of the BWP for uplink and/or downlink transmission; a time-frequency resource for small data transmission in the BWP; and a cell corresponding to the BWP.

By implementing the foregoing method, a parameter of the second BWP is carried through the first message without preconfiguring the parameter of the second BWP through the first message, so that the second BWP is effectively indicated.

In at least one embodiment, the measurement parameter includes a type of a measured reference signal; cell information of the reference signal; a time-frequency resource location of the reference signal; and a function of the reference signal.

By implementing the foregoing method, a BWP is not only configured to perform reference signal measurement in a serving cell, but also be configured to perform reference signal measurement in a neighboring cell, to provide communication between the network device and the terminal device.

In at least one embodiment, the function of the reference signal includes determining whether a timing advance TA is valid or whether to perform cell reselection.

By implementing the foregoing method, the network device determines whether to perform cell reselection through the measured reference signal, to ensure that good quality of service is provided for the terminal device.

According to a second aspect, a communication method is provided. The method is performed by a network device, or is performed by a component (a chip, a circuit, or the like) configured in a network device, and the method includes: A network device sends a first message to a terminal device, where the terminal device camps on a first bandwidth part BWP, the terminal device is in an RRC-non-connected state, and the first message is for indicating the terminal device to switch from the first BWP to a second BWP.

In at least one embodiment, the method further includes: transmitting (sending or receiving) small data or a reference signal with the terminal device on the second BWP.

The foregoing method is also described as follows. A network device sends a first message to a terminal device, where the terminal device camps on a first bandwidth part BWP, the terminal device is in an RRC-non-connected state, and the first message is for indicating a second BWP; and the network device transmits (sends or receives) small data or a reference signal with the terminal device on the second BWP.

In at least one embodiment, the method further includes: sending a second message to the terminal device. The second message is for configuring one or more BWPs for the terminal device, and the one or more BWPs include the second BWP.

For descriptions of the first message and the second message, refer to the first aspect. Details are not described herein again.

According to a third aspect, an apparatus is provided. For beneficial effects, refer to records in the first aspect. The apparatus is a terminal device, or is an apparatus in a terminal device, or is an apparatus that is used in matching with a terminal device. In one design, the apparatus includes a one-to-one unit for performing the method/operation/step/action described in the first aspect, and the unit is a hardware circuit, or software, or a combination of a hardware circuit and software. For example, the apparatus includes a processing unit and a communication unit, and the processing unit and the communication unit performs a corresponding function in any design example of the first aspect. Specifically:

The communication unit is configured to receive a first message from a network device. The first message is for indicating a second BWP. A terminal device camps on a first BWP, and the terminal device is in an RRC-non-connected state. The processing unit is configured to switch from the first BWP to the second BWP. For specific execution processes of the processing unit and the communication unit, refer to the first aspect. Details are not described herein again.

According to a fourth aspect, an apparatus is provided. For beneficial effects, refer to records in the second aspect. The apparatus is a network device, or is an apparatus in a network device, or is an apparatus that is used in matching with a network device. In one design, the apparatus includes a one-to-one unit for performing the method/operation/step/action described in the second aspect, and the unit is a hardware circuit, or software, or a combination of a hardware circuit and software. For example, the apparatus includes a processing unit and a communication unit, and the processing unit and the communication unit performs a corresponding function in any design example of the second aspect. Specifically:

The communication unit is configured to send a first message to a terminal device. The terminal device camps on a first BWP, and the terminal device is in an RRC-non-connected state. The first message is for indicating the terminal device to switch from the first BWP to a second BWP. Optionally, the processing unit is configured to transmit small data or a reference signal with the terminal device on the second BWP.

For specific execution processes of the communication unit and the processing unit, refer to the second aspect. Details are not described herein again.

According to a fifth aspect, an apparatus is provided. For beneficial effects, refer to records in the first aspect. The apparatus includes a processor configured to implement the method described in the first aspect. The apparatus further includes a memory configured to store instructions and/or data. The memory is coupled to the processor. In response to executing the program instructions stored in the memory, the processor implements the method described in the first aspect. The apparatus further includes a communication interface, and the communication interface is used by the apparatus to communicate with another device. For example, the communication interface is a transceiver, a circuit, a bus, a module, a pin or other types of communication interfaces, and the another device is a network device, or the like. In at least one embodiment, the apparatus includes:

- a memory, configured to store program instructions;
- a communication interface, configured to receive a first message from a network device, where the first message is for indicating a second BWP, a terminal device camps on a first BWP, and the terminal device is in an RRC-non-connected state; and
- a processor, configured to switch from the first BWP to the second BWP.

For specific execution processes of the communication interface and the processor, refer to records in the first aspect. Details are not described again.

According to a sixth aspect, an apparatus is provided. For beneficial effects, refer to records in the second aspect. The apparatus includes a processor configured to implement the method described in the second aspect. The apparatus further includes a memory configured to store instructions and/or data. The memory is coupled to the processor. In response to executing the program instructions stored in the memory, the processor implements the method described in the second aspect. The apparatus further includes a communication interface, and the communication interface is used by the apparatus to communicate with another device. For example, the communication interface is a transceiver, a circuit, a bus, a module, a pin or other types of communication interfaces, and the another device is a terminal device, or the like. In at least one embodiment, the apparatus includes:

- a memory, configured to store program instructions;
- a communication interface, configured to send a first message to a terminal device, where the first message is for indicating a second BWP, the terminal device camps on a first BWP, and the terminal device is in an RRC-non-connected state; and
- optionally, a processor, configured to transmit small data or a reference signal with the terminal device on the second BWP.

For specific execution processes of the communication interface and the processor, refer to records in the second aspect. Details are not described again.

According to a seventh aspect, at least one embodiment further provides a computer-readable storage medium, including instructions. In response to the instructions being run on a computer, the computer is enabled to perform the method according to the first aspect.

According to an eighth aspect, at least one embodiment further provides a computer-readable storage medium, including instructions. In response to the instructions being run on a computer, the computer is enabled to perform the method according to the second aspect.

According to a ninth aspect, at least one embodiment further provides a chip system. The chip system includes a processor, and further includes a memory, and is configured to implement the method according to the first aspect. The chip system includes a chip, or include a chip and another discrete device.

According to a tenth aspect, at least one embodiment further provides a chip system. The chip system includes a processor, and further includes a memory, and is configured to implement the method according to the second aspect. The chip system includes a chip, or include a chip and another discrete device.

According to an eleventh aspect, at least one embodiment further provides a computer program product, including instructions. In response to the instructions being run on a computer, the computer is enabled to perform the method according to the first aspect.

According to a twelfth aspect, at least one embodiment further provides a computer program product, including instructions. In response to the instructions being run on a computer, the computer is enabled to perform the method according to the second aspect.

According to a thirteenth aspect, at least one embodiment further provides a system. The system includes the apparatus according to the third aspect or the fifth aspect and the apparatus according to the fourth aspect or the sixth aspect.

DESCRIPTION OF EMBODIMENTS

Figure 1:
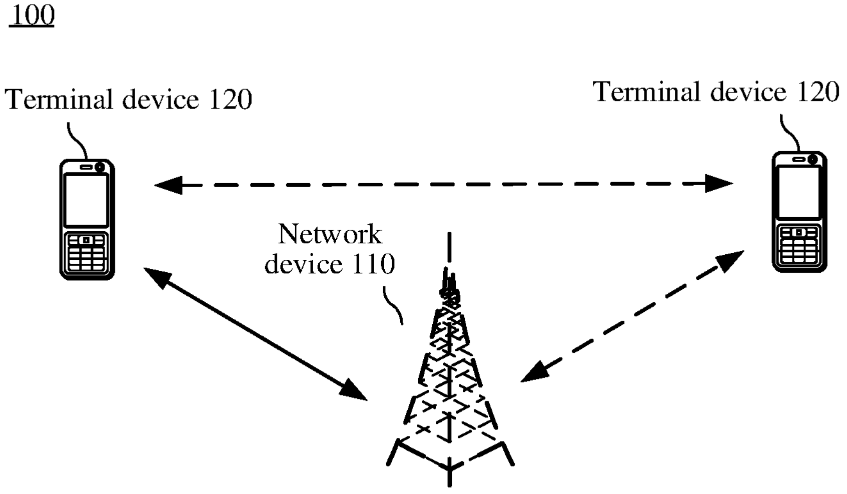
FIG. 1 is an example diagram of a communication system according to at least one embodiment.

FIG. 1 is an example diagram of a communication system 100 to which at least one embodiment is applied. The communication system 100 includes at least one network device 110. The network device 110 is a device that communicates with a terminal device, for example, a base station or a base station controller. Each network device 110 provides communication coverage for a specific geographical area, and communicates with a terminal device located in the coverage area (a cell). The network device 110 is an access network device. The access network device is also referred to as a radio access network (radio access network, RAN) device, and is a device that provides a wireless communication function for the terminal device. The access network device includes, but is not limited to: a generation NodeB (generation NodeB, gNB) in 5G, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (such as a home evolved NodeB or a home NodeB, HNB), a base band unit (base band unit, BBU), a transmitting and receiving point (transmitting and receiving point, TRP), a transmitting point (transmitting point, TP), and/or a mobile switching center. Alternatively, the access network device is further a radio controller, a central unit (central unit, CU), and/or a distributed unit (distributed unit, DU) in a cloud radio access network (cloud radio access network, CRAN) scenario. Alternatively, the network device is a relay station, an access point, an in-vehicle device, a terminal device, a wearable device, a network device in a future 5G network, a network device in a future evolved public land mobile network (public land mobile network, PLMN), or the like.

In at least one embodiment, an apparatus configured to implement a function of the network device is a network device, or is an apparatus, for example, a chip system, that supports the network device in implementing the function. The apparatus is installed in the network device. In the technical solutions provided in at least one embodiment, the technical solutions provided in at least one embodiment are described by using an example in which the apparatus configured to implement the function of the network device is a network device.

The communication system 100 further includes one or more terminal devices 120 within coverage of the network device 110. The terminal device 120 is mobile or fixed. The terminal device 120 is referred to as a terminal for short, and is a device having a wireless transceiver function. The terminal device is deployed on land, where the deployment includes indoor or outdoor, or handheld or vehicle-mounted deployment; is deployed on water (for example, on a ship); or is deployed in air (for example, on an aircraft, a balloon, or a satellite). The terminal device is a mobile phone (mobile phone), a pad (pad), a computer with a wireless transceiver function, a virtual reality (virtual reality, VR) terminal device, an augmented reality (augmented reality, AR) terminal device, a wireless terminal device in industrial control (industrial control), a wireless terminal device in self driving (self driving), a wireless terminal device in remote medical (remote medical), a wireless terminal device in a smart grid (smart grid), a wireless terminal device in transportation safety (transportation safety), a wireless terminal device in a smart city (smart city), and/or a wireless terminal device in a smart home (smart home). The terminal device is alternatively a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, an in-vehicle device, a wearable device, a terminal device in the 5$^{th}$ generation (the 5$^{th}$ generation, 5G) network, a terminal device in a future evolved public land mobile network (public land mobile network, PLMN), or the like. Sometimes, the terminal device is also referred to as user equipment (user equipment, UE). The terminal device 120 communicates with a plurality of access network devices using different technologies. For example, the terminal device communicates with an access network device supporting long term evolution (long term evolution, LTE), or communicates with an access network device supporting 5G, or is dual-connected to an access network device supporting LTE and an access network device supporting 5G. This is not limited in at least one embodiment.

In at least one embodiment, an apparatus configured to implement a function of the terminal device is a terminal device; or is an apparatus, for example, a chip system, that supports the terminal device in implementing the function. The apparatus is installed in the terminal device. In at least one embodiment, the chip system includes a chip, or includes a chip and another discrete device. In the technical solutions provided in at least one embodiment, the technical solutions provided in at least one embodiment are described by using an example in which the apparatus configured to implement the function of the terminal device is a terminal device.

The network device 110 and the terminal device 120 performs data transmission through an air interface resource. The air interface resource includes at least one of a time domain resource, a frequency domain resource, a code domain resource, and a space resource. Specifically, in response to the network device 110 and the terminal device 120 performing data transmission, the network device 110 sends control information to the terminal device 120 through a control channel, for example, a physical downlink control channel (physical downlink control channel, PDCCH), thereby allocating a transmission parameter of a data channel to the terminal device 120, for example, allocating a resource of a physical downlink shared channel (physical downlink shared channel, PDSCH) or a physical uplink shared channel (physical uplink shared channel, PUSCH). For example, the control information indicates a time domain symbol and/or a frequency domain resource block (resource block, RB) to which the data channel is mapped. The network device 110 and the terminal device 120 perform data transmission through the data channel on the allocated time-frequency resource. The data transmission includes downlink data transmission and/or uplink data transmission, where the downlink data (for example, data carried in the PDSCH) transmission indicates that the network device 110 sends data to the terminal device 120, and the uplink data (for example, data carried in the PUSCH) transmission indicates that the terminal device 120 sends data to the network device 110. The data is data in a broad sense, for example, is user data, system information, broadcast information, or other information.

FIG. 1 shows one network device and two terminal devices. Optionally, the communication system 100 includes a plurality of network devices, and coverage of one network device includes another quantity of terminal devices. This is not limited in at least one embodiment.

For ease of understanding, communication nouns or terms used in at least one embodiment are explained and described. The communication nouns or terms are also used as a part of embodiments described herein.

1. Non-Connected State

A radio resource control (radio resource control, RRC) state of a terminal device includes an RRC-connected (RRC-connected) state, an RRC-idle (RRC-idle) state, and an RRC-inactive (RRC-inactive) state. An RRC-non-connected state in the following embodiments includes at least one of the RRC-idle state or the RRC-inactive state. The RRC-non-connected state is referred to as a non-connected state for short. The RRC-connected state is referred to as a connected state for short. The RRC-idle state is referred to as an idle state for short. The RRC-inactive state is referred to as an inactive state for short. In at least one embodiment, at least one is one or more. "A plurality of" is two, three, or more, which is not limited.

Figure 2:
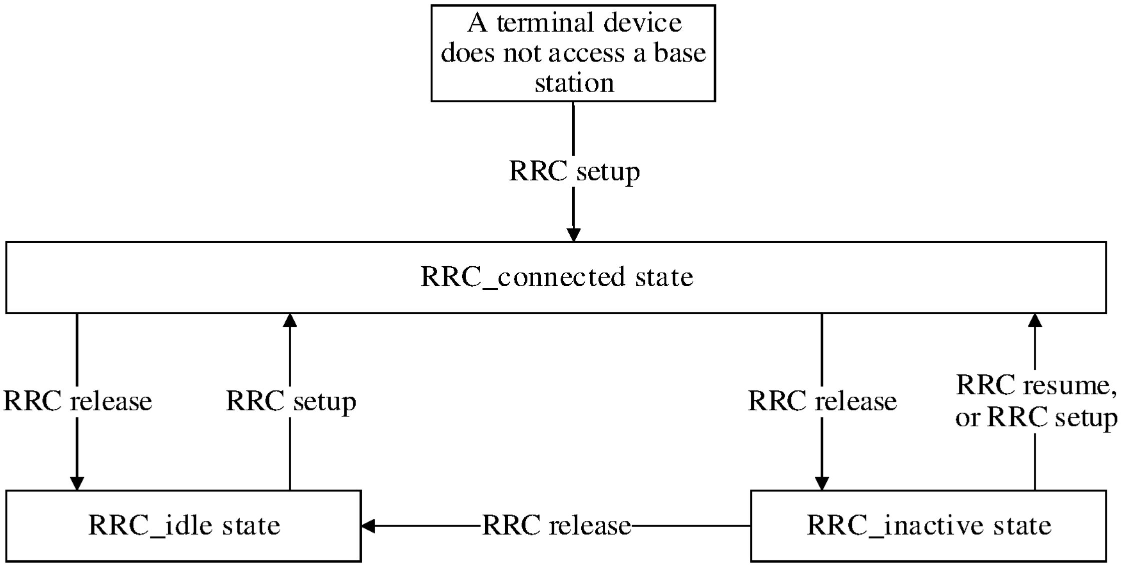
FIG. 2 is a schematic diagram of transformation of an RRC state according to at least one embodiment.

In the following description, an example in which the network device or the access network device is a base station is used for description. Specifically, in a process in which the terminal device accesses the base station or after the terminal device accesses the base station, the terminal device performs an RRC setup process with the base station. After an RRC connection to the base station is set up, an RRC state of the terminal device is the RRC-connected state. Then, the RRC state of the terminal device is transformed in the following states: the RRC-idle state, the RRC-connected state, and the RRC-inactive state In at least one embodiment, as shown in FIG. 2, a process of transformation of the RRC state of the terminal device is as follows:

1. In the RRC-connected state, the base station schedules the terminal device to send an uplink data channel such as a PUSCH. The terminal device sends uplink data to the base station through the uplink data channel, for example, send specific data and/or unicast data of the terminal device to the base station. The base station schedules the terminal device to receive a downlink data channel such as a PDSCH. The terminal device receives downlink data through the down-link data channel, for example, receive specific data and/or unicast data from the base station.

The base station causes the RRC state of the terminal device to be transformed from the RRC-connected state to the RRC-idle state; or cause the RRC state of the terminal device to be transformed from the RRC-connected state to the RRC-inactive state through an RRC release process, for example, by sending an RRC release (RRC release) message to the terminal device.

2. In the RRC-idle state, the terminal device releases the RRC connection to the base station. In this case, the terminal device receives at least one of information for paging, a broadcast message, or system information from the base station. However, the terminal device cannot perform uni-cast data transmission with the base station. For example, the terminal device cannot receive a specific PDSCH of the terminal device from the base station, and/or cannot send a specific PUSCH of the terminal device to the base station; and/or, in this case, the base station is not supported in scheduling the terminal device to receive the specific PDSCH, and/or the base station is not supported in sched-uling the terminal device to send the specific PUSCH.

The base station causes the state of the terminal device to be transformed from the RRC-idle state to the RRC-con-nected state through the RRC setup process. For example, the terminal device sends an RRC setup request (RRC setup request) message to the base station. After receiving the request message, the base station sends an RRC setup (RRC setup) message to the terminal device, to cause the RRC state of the terminal device to be transformed from the RRC-idle state to the RRC-connected state. Alternatively, the base station sends an RRC reject (RRC reject) message to the terminal device, to cause the terminal device to continue to stay in the RRC-idle state.

Optionally, when the terminal device in the RRC-idle state receives the information for paging from the base station, or after being triggered by a higher layer of the terminal device, the terminal device initiates the RRC setup process, to attempt to set up an RRC connection to the base station to enter the RRC-connected state. In at least one embodiment, when the terminal device needs to send data to the base station, the higher layer of the terminal device triggers the terminal device to initiate the RRC setup pro-cess.

3. In the RRC-inactive state, the RRC connection between the terminal device and the base station is released. A core network retains registration information of the terminal device. In this case, the terminal device receives at least one of the information for paging, the broadcast message, or the system information from the base station, and limited uni-cast data transmission is performed between the terminal device and the base station.

The terminal device causes the state of the terminal device to be transformed from the RRC-inactive state to the RRC-connected state through the RRC setup process or an RRC resume (resume) process. The base station causes the state of the terminal device to be transformed from the RRC-inactive state to the RRC-idle state through the RRC release process. In the RRC-inactive state, after the terminal device receives the information for paging from the base station or is triggered by the higher layer of the terminal device, the terminal device initiates the RRC resume (resume) process, to attempt to resume the RRC connection to the base station, so as to enter the RRC-connected state. For example, the RRC resume process between the terminal device and the base station includes that the terminal device sends an RRC resume request (RRC resume request) message to the base station, and after receiving the request message, the base station sends an RRC setup (RRC setup) message or an RRC resume (RRC resume) message to the terminal device, to cause the state of the terminal device to be transformed from the RRC-inactive state to the RRC-connected state; or the base station sends an RRC release (RRC release) message to the terminal device, to cause the state of the terminal device to be transformed from the RRC-inactive state to the RRC-idle state; or the base station sends an RRC reject (RRC reject) message to the terminal device, to cause the terminal device to continue to stay in the RRC-inactive state.

Optionally, characteristics that the terminal device is in the RRC-inactive state include at least one of the following: The core network retains the registration information of the terminal device, and the terminal device suspends most air interface behaviors with the base station, for example, suspending monitoring of scheduling information, suspend-ing sending of a scheduling request, suspending radio resource management (radio resource management, RRM) measurement, or suspending beam maintenance. In general, compared with the RRC-connected state, the RRC-inactive state is a more power-saving state of the terminal device.

In the following description, the RRC-connected state and the connected state, the RRC-idle state and the idle state, and the RRC-inactive state and the inactive state are not distin-guished, and are replaced with each other.

2. Carrier Bandwidth Part (Carrier Bandwidth Part, BWP)

The carrier bandwidth part is referred to as a bandwidth part (bandwidth part, BWP) for short, and the BWP is a group of continuous frequency domain resources on a car-rier. For example, the BWP is a group of continuous resource blocks (resource block, RB) on a carrier, or the BWP is a group of continuous subcarriers on a carrier, or the BWP is a group of continuous resource block groups (re-source block group, RBG) on a carrier. One RBG includes at least one RB, for example, 1, 2, 4, 6, or 8, and one RB includes at least one subcarrier, for example, 6, 12, 14, or another positive integer. In at least one embodiment, in a cell, for the terminal device in the RRC-connected state, the network device configures a maximum of 4 BWPs for the terminal device. For each BWP, the network device config-ures a system parameter including a subcarrier spacing and/or a cyclic prefix (cyclic prefix, CP) length for the terminal device. At any moment, in a cell, only one BWP is activated for one terminal device in the RRC-connected state, and the terminal device and the network device send and receive data on the activated BWP.

3. Initial Access Process of Terminal Device

Figure 3:
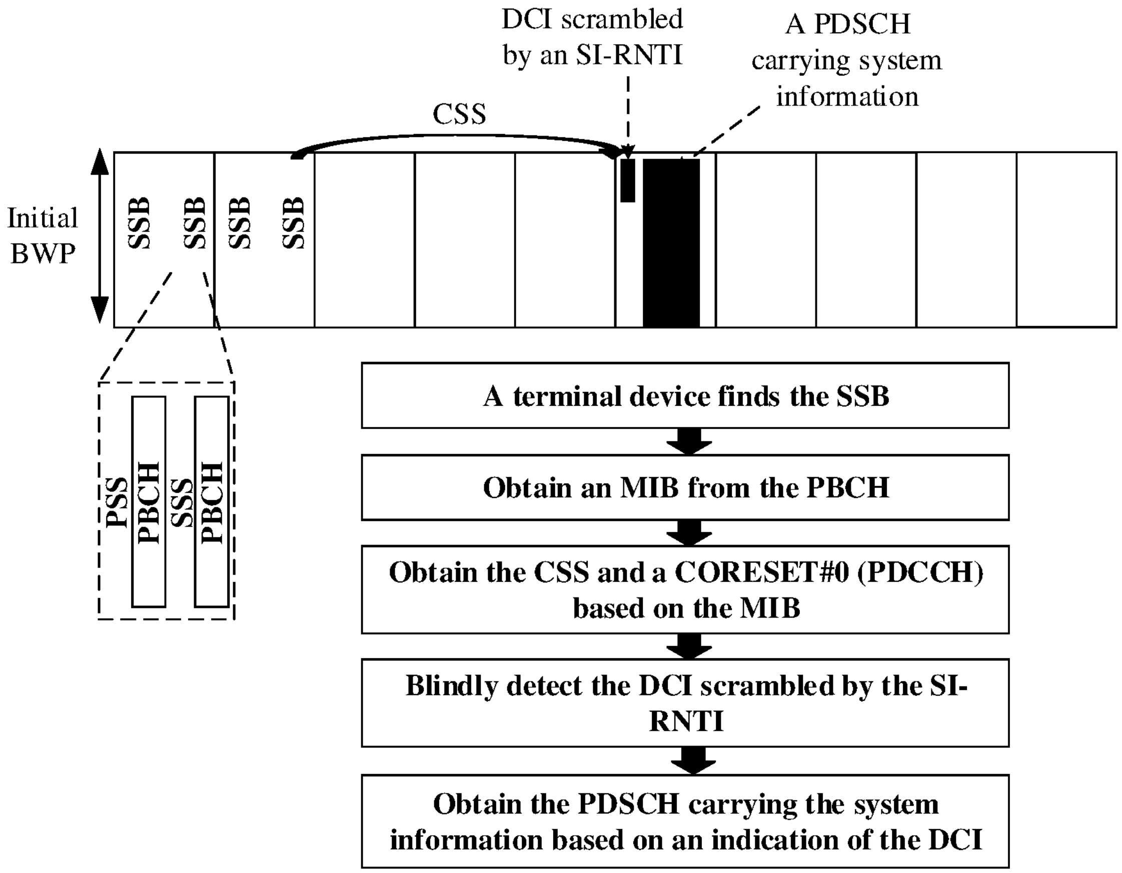
FIG. 3 is a schematic diagram of an initial access process of a terminal device according to at least one embodiment.

In response to the terminal device in the non-connected state (for example, the terminal device in the idle state or the terminal device in the inactive state) performing downlink synchronization with the network device and obtaining the system information (or update the system information), initial access is performed. As shown in FIG. 3, the initial access process mainly includes the following steps.

Step 1: A terminal device searches for a synchronization signal and PBCH block (synchronization signal and PBCH block, SSB). The SSB includes a primary synchronization signal (primary synchronization signal, PSS), a secondary synchronization signal (secondary synchronization signal, SSS), and a physical broadcast channel (physical broadcast channel, PBCH).

Step 2: The terminal device obtains a master information block (master information block, MIB) from the PBCH.

Step 3: The terminal device determines a common search space (common search space, CSS) and a control resource set (control resource set, CORESET) #0 based on PDCCH configuration (PDCCH-config) information in the MIB. Optionally, a frequency range of the CORESET #0 is a frequency range of an initial BWP.

Step 4: The terminal device blindly detects, in a time-frequency resource jointly determined based on the CORESET #0 and the CSS, downlink control information (downlink control information, DCI) scrambled by a system information radio network temporary identifier (system information radio network temporary identifier, SI-RNTI).

Step 5: Obtain, based on an indication of the DCI, system information in a time unit (for example, a slot) indicated by an arrow in FIG. 3. The DCI is DCI for scheduling a PDSCH, the PDSCH carries the system information, and the system information includes a paging resource and a random access resource.

4. Paging Process of Terminal Device

Figure 4:
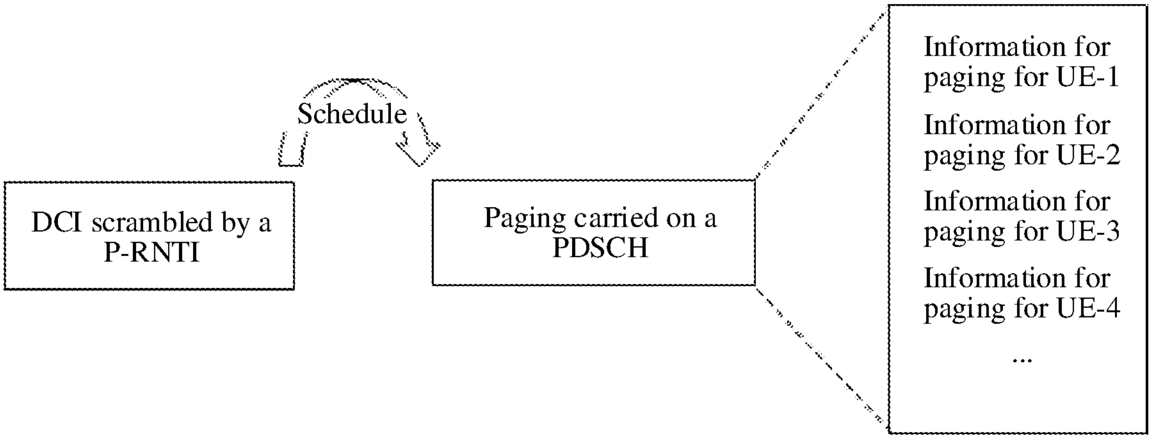
FIG. 4 is a schematic diagram of a paging process according to at least one embodiment.

A process in which the non-connected terminal device, for example, the terminal device in the idle state or the terminal device in the inactive state, receives the information for paging is shown in FIG. 4, and mainly includes the following several steps.

Step 1: A terminal device blindly detects, in a CORESET and search space SS for paging (optionally, the CORESET and the SS is configured through a paging resource in system information), DCI scrambled by a paging radio network temporary identifier (paging RNTI, P-RNTI).

Step 2: The terminal device receives, based on an indication of the P-RNTI, a PDSCH that carries information for paging, to obtain the information for paging of the terminal device. Optionally, the information for paging includes paging for a plurality of terminal devices. For example, as shown in FIG. 4, the information for paging includes information for paging for UE-1, information for paging for UE-2, information for paging for UE-3, information for paging for UE-4, and the like.

5. Random Access Process of Terminal Device

In a wireless communication system such as LTE, 5G new radio (new radio, NR), or a future communication system, the terminal device performs random access through a four-step access method or a two-step access method. The four-step access method is referred to as a 4-step RACH manner for short. The two-step access method is referred to as a 2-step RACH manner for short.

Figure 5A:
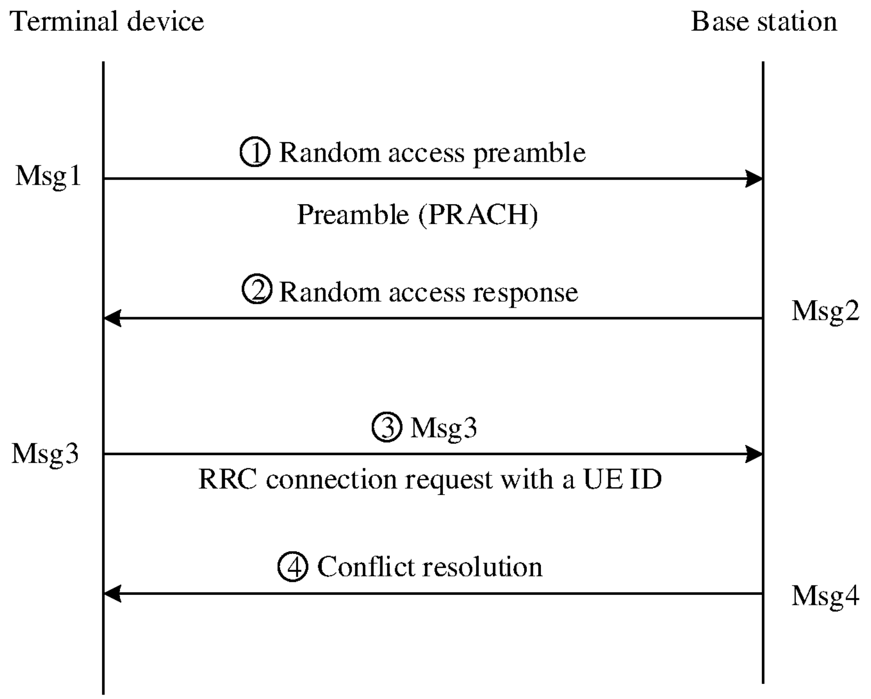
FIG. 5*a* and FIG. 5*b* are schematic diagrams of a random access process according to at least one embodiment.

In at least one embodiment, as shown in FIG. 5*a*, a four-step random access procedure includes the following steps.

Step 1: A terminal device sends a random access preamble (preamble), also referred to as a message1 (message1, Msg1), to a base station.

The terminal device determines a random access radio network temporary identifier (random access RNTI, RA-RNTI) based on a sending occasion of the preamble.

Optionally, the preamble is a sequence, and a function of the preamble is to notify the base station that there is a random access request, and enable the base station to estimate a transmission delay between the terminal device and the base station, so that the base station calibrates uplink timing (uplink timing) of the terminal device, and notifies the terminal device of calibration information through a timing advance (timing advance, TA) instruction.

Step 2: After detecting the preamble, the base station determines, based on a receiving occasion of the preamble, an RA-RNTI that is the same as that in step 1, and send a random access response, also referred to as a message2 (message2, Msg2), to the terminal device.

Optionally, DCI for scheduling the random access response is scrambled by the RA-RNTI, and content of the random access response includes a preamble index (preamble index) of the preamble received in step 1, a TA, uplink resource allocation information, a temporary cell radio network temporary identifier (temporary cell RNTI, TC-RNTI), and the like.

Step 3: The terminal device receives the random access response.

In response to a random access preamble indicated by the preamble index carried in the received random access response being the same as the preamble sent by the terminal device to the base station in step 1, the terminal device considers that the random access response includes a random access response of the terminal device. After receiving the random access response, the terminal device determines an uplink resource allocated by the base station to the terminal device, and sends an uplink message, also referred to as a message3 (message3, Msg3), on the uplink resource. Optionally, the terminal device initiates an RRC connection request in the Msg3. The Msg3 includes the RRC connection request (RRC connection request), and the RRC connection request carries an ID of the terminal device (for example, UE).

Step 4: The base station receives the uplink message of the terminal device, and returns a conflict resolution message, also referred to as a message4 (message4, Msg4), to a successfully accessed terminal device.

Optionally, a PDSCH that carries the Msg4 is scheduled by control information (for example, DCI). The control information is scrambled by a cell radio network temporary identifier (cell RNTI, C-RNTI) of the terminal device. The Msg4 carries an identifier of the successfully accessed terminal device, and another unsuccessfully accessed terminal device re-initiates random access. Further, the base station performs RRC configuration on the terminal device through the Msg4.

Figure 5B:
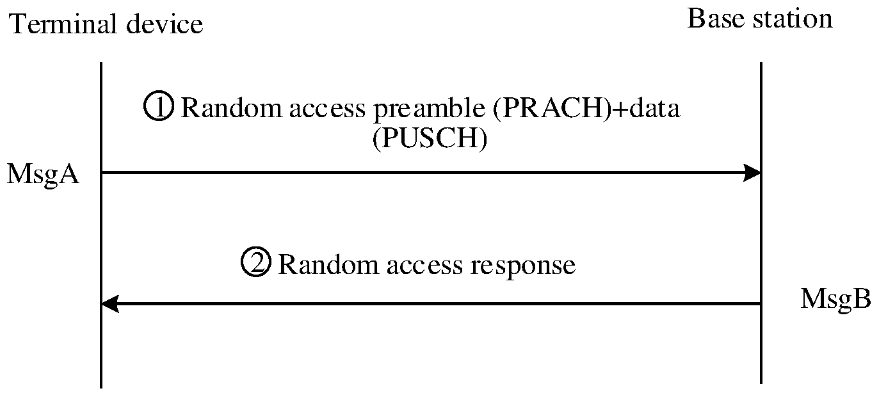

In at least one embodiment, as shown in FIG. 5*b*, a two-step random access procedure includes the following steps.

Step 1: A terminal device sends a random access preamble (preamble) and data to a base station, where the random access preamble and data is also referred to as a MsgA. The random access preamble is carried in a physical random access channel (physical random access channel, PRACH), and the data is carried in a PUSCH.

Optionally, the data includes an ID of the terminal device. The terminal device determines an RA-RNTI based on a sending occasion of the preamble. The MsgA carries an RRC configuration request.

Step 2: The base station sends a random access response to the terminal device, where the random access response is also referred to as a MsgB.

The base station determines, based on a receiving occasion of the preamble, an RA-RNTI that is the same as that in step 1. Control information (for example, DCI) is scrambled by the RA-RNTI, and the control information is for scheduling a data channel (for example, a PDSCH) carrying the random access response. The random access response includes a unique identifier of the terminal device to specify a successfully accessed terminal device, and another unsuccessfully accessed terminal device re-initiates random access. The random access response further includes a C-RNTI allocated to the terminal device. The base station performs RRC configuration on the terminal device through the MsgB.

Figure 6A:
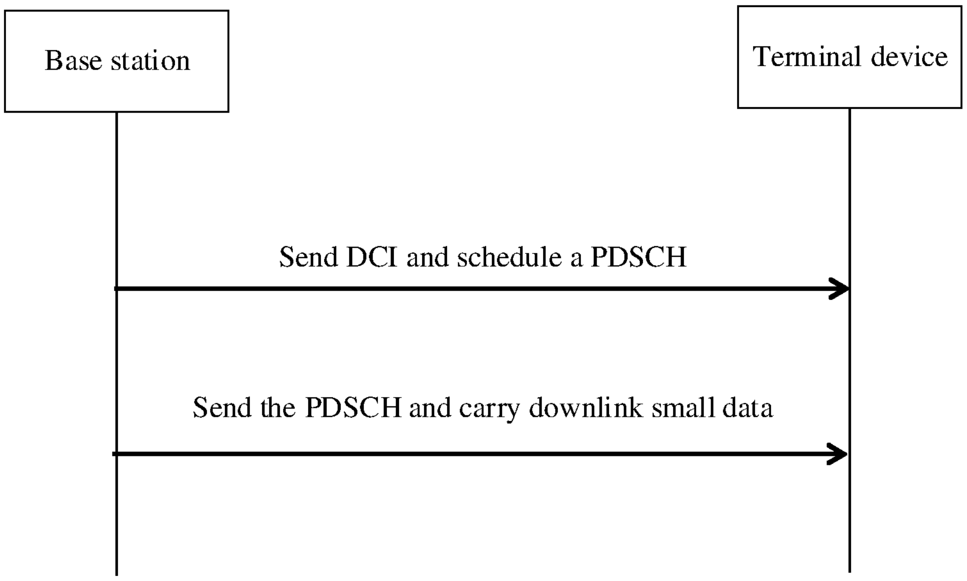
FIG. 6*a* and FIG. 6*b* are schematic diagrams of a small data transmission process according to at least one embodiment.

6. Uplink and Downlink Small Data (Small Data) Receiving and Sending Processes of Terminal Device in Inactive State In at least one embodiment, as shown in FIG. 6*a*, a downlink small data receiving procedure of the terminal device in the inactive state includes the following steps.

Step 1: A base station sends DCI to a terminal device, where the DCI is for scheduling a PDSCH carrying downlink small data.

Step 2: The base station sends the PDSCH to the terminal device, where the PDSCH carries the downlink small data.

Optionally, a size of small data is not limited in at least one embodiment. For example, the small data is a data packet carried in a transmit block (transmit block, TB), or the small data is a data packet carrying information of less than 100 bytes or other positive integer bytes. Further, the small data is a terminal device-specific data packet or the like.

Figure 6B:
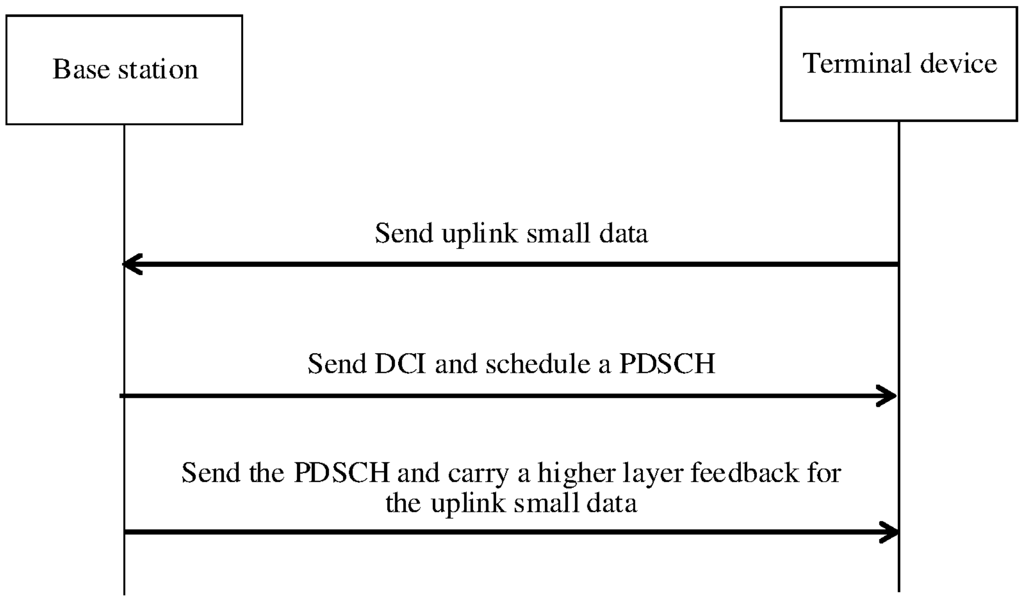

In at least one embodiment, as shown in FIG. 6*b*, procedures of sending uplink small data and receiving a feedback to the uplink small data of the terminal device in the inactive state include the following steps.

Step 1: A terminal device sends uplink small data to a base station.

Step 2: The base station sends DCI to the terminal device, where the DCI is for scheduling a PDSCH.

Step 3: The base station sends the PDSCH to the terminal device, where the PDSCH carries feedback information for the uplink small data, for example, acknowledgment (acknowledgement, ACK) or negative acknowledgment (negative acknowledgement, NACK).

Optionally, a manner in which the terminal device in the inactive state sends the uplink small data is a configured grant (configured grant, CG) manner, a random access manner, or the like. In response to the CG manner being used, the terminal device in the inactive state directly sends the uplink data packet on a CG resource (for example, a PUSCH resource) configured by a network side for the terminal device. In response to a 2-step RACH manner being used, the terminal device in the inactive state sends a preamble and the uplink small data on an RACH resource and a PUSCH resource that are configured by a network side for the terminal device. In response to a 4-step RACH manner being used, the terminal device carries the uplink small data in a Msg3 of a 4-step RACH.

7. Reduced Capability (Reduced Capability, REDCAP) Terminal Device

In a communication system, for example, an NR communication system or another system, compared with a conventional terminal device, for example, an enhanced mobile broadband (enhanced mobile broadband, eMBB) terminal device, a light (light) terminal device is introduced. The light terminal device is also referred to as a REDCAP terminal device.

Compared with the REDCAP terminal device, the conventional terminal device is a high-capability terminal device or a terminal device with unlimited capabilities. In at least one embodiment, the conventional terminal device is replaced with a high-capability terminal device that is introduced in the future and that is relative to the REDCAP terminal device. For example, a capability comparison between the high-capability terminal device and the REDCAP terminal device meets one or more of the following Item 1 to Item 9.

Item 1: A maximum bandwidth supported by the high-capability terminal device is greater than a maximum bandwidth supported by the REDCAP terminal device. For example, the maximum bandwidth supported by the high-capability terminal device is 100 MHz (megahertz) or 200 MHz, and the maximum bandwidth supported by the REDCAP terminal device is 20 MHz, 10 MHz, or 5 MHz.

Item 2: A quantity of antennas of the high-capability terminal device is greater than a quantity of antennas of the REDCAP terminal device. The quantity of antennas is an actual quantity of antennas of the terminal device, or a maximum quantity of antennas that are for sending and/or receiving. For example, the high-capability terminal device supports a maximum of 4 antennas for receiving and 2 antennas for sending, and the REDCAP terminal device supports a maximum of 2 antennas for receiving and 1 antenna for sending. Alternatively, even though the quantity of antennas of the high-capability terminal device is equal to the quantity of antennas of the REDCAP terminal device, capabilities of antenna selective transmission are different. For example, both the high-capability terminal device and the REDCAP terminal device support 2 antennas for sending, but the high-capability terminal device supports antenna selective transmission, and the REDCAP terminal device does not support antenna selective transmission. Single-antenna port data transmission is used as an example. The high-capability terminal device implements switching of the single-antenna port data transmission on two sending antennas, and the data transmission obtains a spatial diversity gain. The single-antenna port data transmission of the REDCAP terminal device is implemented on two sending antennas at the same time, which is equivalent to transmission performance of one sending antenna.

Item 3: Maximum transmission power supported by the high-capability terminal device is greater than maximum transmission power supported by the REDCAP terminal device. For example, the maximum transmission power supported by the high-capability terminal device is 23 decibel-milliwatt (decibel-milliwatt, dBm) or 26 dBm, and the maximum transmission power supported by the REDCAP terminal is a value between 4 dBm and 20 dBm.

Item 4: The high-capability terminal device supports carrier aggregation (carrier aggregation, CA), and the REDCAP terminal device does not support carrier aggregation.

Item 5: In response to both the high-capability terminal device and the REDCAP terminal device supporting carrier aggregation, a maximum quantity of carriers supported by the high-capability terminal device is greater than a maximum quantity of carriers supported by the REDCAP terminal device. For example, the high-capability terminal device supports aggregation of a maximum of 32 carriers or 5 carriers, and the REDCAP terminal device supports aggregation of a maximum of 2 carriers.

Item 6: The high-capability terminal device and the REDCAP terminal device are introduced in different protocol releases. For example, in an NR protocol, the high-capability terminal device is a terminal device introduced in a release (Release, R) 15 of the protocol, and the REDCAP terminal device is a terminal device introduced in R17 of the protocol.

Item 7: The high-capability terminal device and the REDCAP terminal device have different duplex capabilities. The high-capability terminal device has a stronger duplex capability. For example, the high-capability terminal device supports full-duplex frequency division duplex (frequency division duplex, FDD), that is, the high-capability terminal device supports receiving and sending at the same time when supporting FDD. The REDCAP terminal device supports half-duplex FDD, that is, the REDCAP terminal device does not support receiving and sending at the same time when supporting FDD.

Item 8: A data processing capability of the high-capability terminal device is stronger than a data processing capability of the REDCAP terminal device. The high-capability terminal device processes more data in the same time, or the high-capability terminal device processes same data in a shorter processing time. For example, a time when the terminal device receives downlink data from the network device is recorded as T1, and after the terminal device processes the downlink data, a time when the terminal device sends a feedback to the downlink data to the network device is recorded as T2. A delay (time difference) between T2 and T1 of the high-capability terminal device is less than a delay between T2 and T1 of the REDCAP terminal device. The feedback to the downlink data is an ACK feedback or a NACK feedback.

Item 9: A peak rate of data transmission of the high-capability terminal device is greater than a peak rate of data transmission of the REDCAP terminal device. The data transmission includes uplink data transmission (that is, the terminal device sends data to the network device) and/or downlink data transmission (that is, the terminal device receives data from the network device).

8. Control Resource Set (Control Resource Set, CORESET)

The CORESET is a time-frequency resource used by the terminal device to determine a search range of the control information. One CORESET is configured for one terminal device or a group of terminal devices. For example, in response to a CORESET1 being configured for UE1, UE2, UE3, and UE4, the base station sends PDCCHs of the UE1, the UE2, the UE3, and the UE4 on the CORESET1. In response to a CORESET2 being configured for UE5, UE6, UE7, and UE8, the base station sends PDCCHs of the UE5, the UE6, the UE7, and the UE8 on the CORESET2. One or more CORESETs is also configured for one terminal device.

9. Search Space (Search Space, SS)

A time set of PDCCHs that need to be monitored by the terminal device is referred to as an SS. The SS is divided into common search space (common search space, CSS) and UE-specific search space (UE-specific search space, USS). The CSS is for transmitting control information related to common information such as paging (paging), a random access response (random access response, RA Response), and a broadcast control channel (broadcast control channel, BCCH). The control information is cell-level common control information or common control information of a plurality of terminal devices, and is for scheduling common information of a cell or common information of a plurality of terminal devices. The USS is for transmitting a UE-specific PDCCH. For example, control information carried in the PDCCH is a physical downlink shared channel (physical downlink shared channel, PDSCH) and/or a physical uplink shared channel (physical uplink shared channel, PUSCH) for scheduling the UE.

10. Time Unit

A unit of the time unit is a unit such as a radio frame (radio frame), a subframe (subframe), a slot (slot), a mini-slot (mini-slot), or a symbol (symbol). For example, in a specific implementation, one time unit includes 2 slots or the like. One radio frame includes one or more subframes, and one subframe includes one or more slots. There are different slot lengths for different subcarrier spacings. One slot includes one or more symbols. For example, a slot with a normal cyclic prefix (cyclic prefix, CP) includes 14 time domain symbols, and a slot with an extended CP includes 12 time domain symbols. The time domain symbol is referred to as a symbol for short. The time domain symbol is an orthogonal frequency division multiplexing (orthogonal frequency division multiplexing, OFDM) symbol, or is a discrete Fourier transform spread orthogonal frequency division multiplexing (discrete Fourier transform spread orthogonal frequency division multiplexing, DFT-s-OFDM) symbol. In at least one embodiment, an example in which the time domain symbol is an OFDM symbol is used for description. A mini-slot, also referred to as a mini-slot, is a smaller unit than a slot, and one mini-slot includes one or more symbols. For example, one mini-slot includes 2 symbols, 4 symbols, 7 symbols, or the like. One slot includes one or more mini-slots.

Unless otherwise specified, "/" in the descriptions of at least one embodiment represents an "or" relationship between associated objects. For example, A/B represents A or B. In at least one embodiment, "and/or" describes only an association relationship for describing associated objects and represents that three relationships exist. For example, A and/or B represents the following three cases: Only A exists, both A and B exist, and only B exists, where A and B are singular or plural. In addition, in the descriptions of at least one embodiment, unless otherwise specified, "a plurality of" means two or more than two. "At least one of the following items (pieces)" or a similar expression thereof refers to any combination of these items, including a singular item (piece) or any combination of plural items (pieces). For example, at least one of a, b, or c indicates: a, b, c, a and b, a and c, b and c, or a, b, and c, where a, b, and c are singular or plural. In addition, to clearly describe the technical solutions in at least one embodiment, terms such as "first" and "second" are used in at least one embodiment to distinguish between same items or similar items that have basically the same functions or purposes. A person skilled in the art understands that the terms such as "first" and "second" do not limit a quantity or an execution sequence, and the terms such as "first" and "second" do not indicate a definite difference.

In addition, network architectures and service scenarios described in at least one embodiment are intended to describe the technical solutions in at least one embodiment more clearly, and do not constitute a limitation on the technical solutions provided in at least one embodiment. A person of ordinary skill in the art is able to learn that with evolution of the network architectures and emergence of new service scenarios, the technical solutions provided in at least one embodiment are also applicable to similar technical problems.

In at least one embodiment, based on load of the network device and a service to be provided by the terminal device, the network device configures one or more BWPs for the terminal device in the RRC-connected state, and activates one of the BWPs. The terminal device communicates with the network device on the activated BWP. The RRC-connected state is referred to as an RRC-active state. For example, when the terminal device is in the RRC-connected state, in response to the terminal device transmitting a large amount of data, the network device activates a BWP with a wide bandwidth for the terminal device. In response to finding that a currently activated BWP for the terminal device has heavy load, the network device activates another idle BWP for the terminal device, or reconfigure an idle BWP for the terminal device.

The network device configures an uplink/downlink initial BWP, namely, an initial BWP, for a cell through the system information. After the terminal device randomly accesses the cell and communicates with the network device, the network device configures a dedicated BWP for the terminal device in the RRC-connected state based on a service and load status. For example, a maximum of 4 BWPs are configured for the terminal device, the network device activates one of the BWPs, and one terminal device simultaneously activates only one BWP in one cell.

The terminal device in the non-connected state, for example, the terminal device in the idle (idle) state and the terminal device in the inactive (inactive) state, usually camps on the initial BWP. The initial BWP is for transmitting the SSB, for transmitting the system information, for random access performed by the terminal device, and/or for paging the terminal device. In response to there being a large quantity of terminal devices in the non-connected state that camp on a cell, in response to all these terminal devices performing random access and/or paging on the initial BWP, resource congestion of the initial BWP is caused.

To resolve the foregoing technical problem, at least one embodiment provides a communication method. The method includes: A terminal device camps on a first BWP, where the terminal device is in a non-connected state; the terminal device receives a first message from a network device, where the first message is for indicating a second BWP; and the terminal device switches from the first BWP to the second BWP. Optionally, on the second BWP, the terminal device sends small data and/or a reference signal to the network device, and/or receives small data and/or a reference signal from the network device. In at least one embodiment, the terminal device in the non-connected state performs BWP switching, to resolve a problem of resource congestion of the initial BWP caused when all the terminal devices in the non-connected state camp on the initial (initial) BWP. The terminal device in at least one embodiment is alternatively a component (a chip, a circuit, or the like) configured in the terminal device, and the network device is alternatively a component (a chip, a circuit, or the like) configured in the network device.

Figure 7:
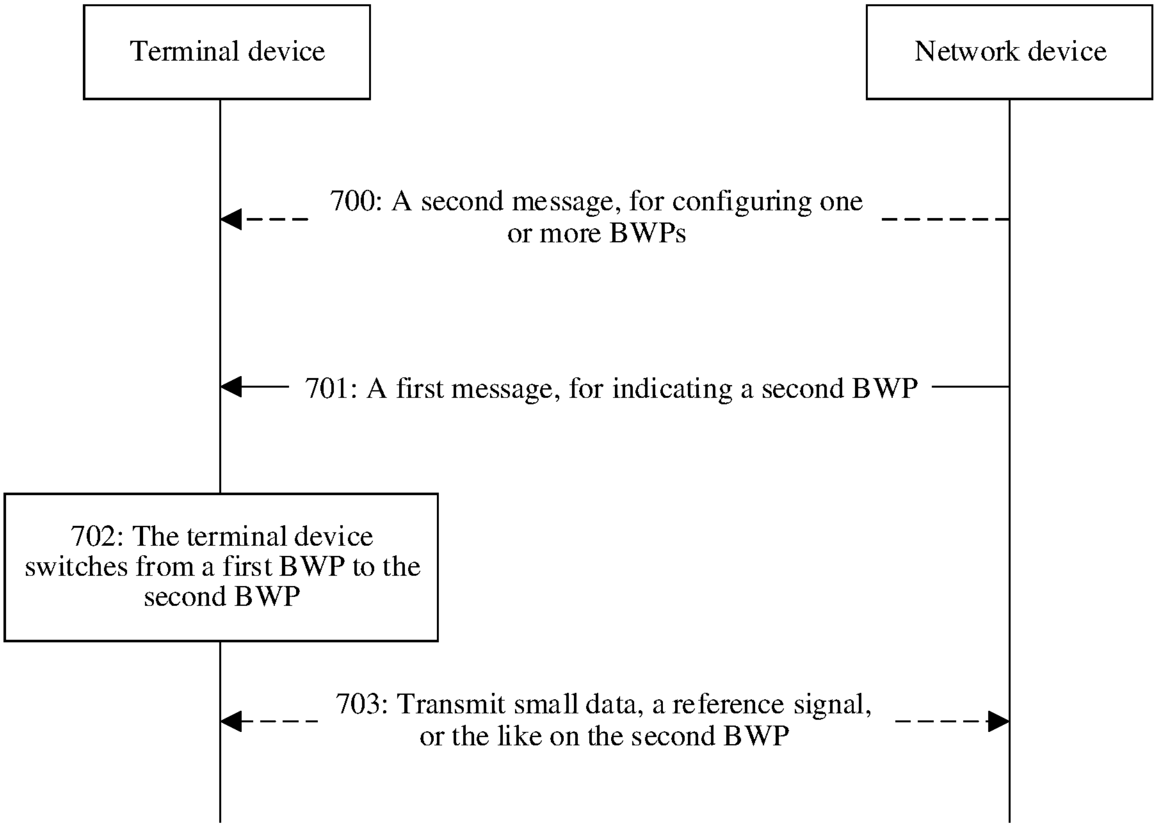
FIG. 7 is a flowchart of a communication method according to at least one embodiment.

As shown in FIG. 7, a procedure of a communication method is provided, including at least the following steps.

Optionally, step 700: The terminal device receives a second message from the network device, where the second message is for configuring one or more BWPs for the terminal device, and the one or more BWPs include at least the second BWP.

Optionally, the second message is an RRC release message, system information, information for paging, or a message carried in a PDSCH. For example, when the terminal device is in an RRC-connected state, the network device configures one or more BWPs for the terminal device through the RRC release message or the system information. In response to the terminal device being in an RRC-inactive state, the network device configures one or more BWPs for the terminal device through the message carried in the PDSCH, for example, a downlink unicast data packet or downlink small data carried in the PDSCH. A BWP indicated through the RRC release message or the message carried in the PDSCH is considered as a BWP separately configured for each terminal device, and a BWP indicated by the system information is considered as a BWP configured for all the terminal devices in a cell. The PDSCH carrying a downlink unicast message is scheduled by DCI, and the DCI is scrambled by a specific RNTI of the terminal device.

In at least one embodiment, as shown in Table 1, the second message is for indicating at least one of the following content in each of the one or more BWPs:

TABLE 1

Parameters of each configured BWP

| Configured BWP parameter | | Content/meaning |
|---|---|---|
| BWP parameter | | BWP ID, location and bandwidth (location and bandwidth), subcarrier spacing (subcarrier spacing, SCS), BWP-downlink (BWP-downlink), BWP-uplink (BWP-uplink), and the like |
| Measurement-related configuration (measurement parameter) | Type of measured reference signal | SSB or CSI-RS, or no measurement is performed |
| | Characteristic of measured reference signal | Cell ID or simplified ID (cell ID or simplified ID) + SSB index |
| | Time-frequency location of measured reference signal | SSB index/CSI-RS period/location and bandwidth |
| | Function of measured reference signal | Whether the measured reference signal is for determining whether a TA is valid and whether the measured reference signal is for UE to reselect a cell |
| BWP switch period | | Switching period of configured BWP and period for specifically performing BWP switching |
| Use of BWP for uplink and/or downlink transmission | | Indicate whether the configured BWP is for uplink transmission or downlink transmission |

TABLE 1-continued

| Parameters of each configured BWP | |
|---|---|
| Configured BWP parameter | Content/meaning |
| Time-frequency resource for small data transmission in BWP | Configured grant (configured grant, CG) resource/random access (random access) resource + (target cell) |

The BWP parameter in Table 1 is considered as a first group of parameters of the BWP, and parameters such as the measurement-related configuration, the BWP switch period, the use of BWP for uplink and/or downlink transmission, and the time-frequency resource for small data transmission in the BWP is considered as a second group of parameters. The following describes meanings of the two groups of parameters.

First Group of Parameters:

(1) The location and bandwidth (location and bandwidth) indicate a frequency-domain location and a bandwidth of the BWP in a carrier.

(2) The SCS indicates an SCS of the BWP.

(3) The BWP-downlink configures a downlink parameter of the BWP, including at least one of the following content of the BWP: configuration information of a PDCCH, configuration information of a CSI-RS, and configuration information of a PDSCH.

(4) The BWP-uplink configures an uplink parameter of the BWP, including at least one of the following content of the BWP: configuration information of a physical uplink control channel (physical uplink control channel, PUCCH), configuration information of a PUSCH, configuration information of a sounding reference signal (sounding reference signal, SRS), a beam mismatch recovery configuration, and the like.

Second Group of Parameters:

(1) Measurement parameter. The measurement parameter includes at least one of the following content:

A type of a measured reference signal. For example, the type of the reference signal includes an SSB, a channel state information reference signal (channel state information reference signal, CSI-RS), or no measurement is performed.

Cell information of the reference signal, for example, a reference signal for indicating to measure a serving cell or a reference signal of a neighboring cell. Optionally, the terminal device is further configured to measure a reference signal of a beam in the serving cell or the neighboring cell. There is a correspondence between the beam and the SSB index, and an SSB index is specifically indicated. For example, the cell information of the configured reference signal is neighboring cell+SSB index1, which indicates that the terminal device is configured to measure a reference signal of a beam corresponding to the SSB index1 in the neighboring cell. The serving cell or the neighboring cell are represented by a cell ID, or are represented by a cell simplified ID.

A time-frequency resource location of the reference signal. In at least one embodiment, a time domain location of the reference signal is indicated through a period length of the reference signal, a starting location in the period, and duration in the period; and a frequency domain location of the reference signal is indicated through a starting frequency location and a frequency width (for example, location and bandwidth) of the reference signal. In at least one embodiment, different time-frequency resources is preconfigured for different SSBs, and different time-frequency resources is indicated through the SSB index.

A function of the reference signal. The function of the reference signal includes determining whether a timing advance TA is valid and/or whether to perform cell reselection. In at least one embodiment, in response to reference signal received power (reference signal received power, RSRP) measured by the terminal device at two consecutive times being greater than a threshold, the TA is invalid; otherwise, the TA is considered valid. In at least one embodiment, in response to the terminal device performing neighboring cell measurement on a BWP of the serving cell and a measurement value of the neighboring cell is high (or a measurement result of the neighboring cell is higher than a measurement result of the serving cell), or the terminal device performs serving cell measurement on a BWP of the serving cell and a measurement value of the serving cell is low (or a measurement result of the serving cell is lower than a measurement result of the neighboring cell), the terminal device performs cell reselection to switch to the neighboring cell.

(2) BWP switch period. One or more BWP switch periods are configured for each BWP. Each BWP switch period includes a BWP switching period and indication information of a period for specifically performing BWP switching, for example, indicating the terminal device to switch in this period, or switch in an $N^{th}$ period after this period. Optionally, in response to the terminal device performing switching in this BWP switching period, the terminal device specifically performs BWP switching immediately after receiving information for indicating BWP switching, or perform BWP switching in an $M^{th}$ time unit after receiving the information for BWP switching, where M is a positive integer greater than or equal to 1. In response to the terminal device performing BWP switching in the $N^{th}$ period after this period, the terminal device performs BWP switching at the beginning of the $N^{th}$ period.

(3) Use of BWP for uplink and/or downlink transmission. Because terminal devices of different service types provide uplink and downlink services, the network device configures different BWPs for uplink and downlink transmission of the terminal device. For example, in response to the foregoing BWP being configured for uplink transmission, the terminal device performs uplink transmission instead of downlink transmission on the BWP. Similarly, in response to the foregoing BWP being configured for downlink transmission, the terminal device performs downlink transmission instead of uplink transmission on the BWP. In response to the BWP being configured for uplink transmission and downlink transmission, the terminal device performs both uplink transmission and downlink transmission on the BWP.

(4) Time-frequency resource for small data transmission in BWP. One or more time-frequency resources for small data transmission are configured for each BWP. Optionally, each time-frequency resource for small data transmission includes a search time-frequency range of control information for scheduling small data transmission, and/or a transmission resource of a data channel for carrying small data transmission. In at least one embodiment, the terminal device determines a candidate resource location of a PDCCH based on the search time-frequency range of the control information for scheduling small data transmission, and monitor the PDCCH at the determined candidate resource location. Subsequently, small data is transmitted on the PDSCH and/or the PUSCH based on scheduling of the monitored PDCCH. In at least one embodiment, the terminal device determines, based on the foregoing configured transmission resource of the data channel for carrying small data transmission, a PDSCH resource and/or a PUSCH resource for transmitting small data, and transmit small data on the PDSCH resource and/or the PUSCH resource.

The search time-frequency range of the control information for scheduling small data transmission is indicated in a manner such as configuring a control resource set CORESET and/or search space SearchSpace. The transmission resource of the data channel for carrying small data transmission is also referred to as a data information transmission resource, or a resource of the PDSCH and/or the PUSCH.

Optionally, the resource of the PDSCH and/or the PUSCH for small data transmission includes a time domain resource of the PDSCH and/or the PUSCH for small data transmission and a frequency domain resource of the PDSCH and/or the PUSCH for small data transmission. The time domain resource of the PDSCH and/or the PUSCH for small data transmission use the following indication manner: indicating a period of small data transmission (the period is represented by a quantity of first time units such as slots), indicating one or more first time units (such as a slot) for small data transmission in the period, and indicating one or more second time units (such as a symbol) for small data transmission in the first time unit. An example in which the first time unit is a slot, and the second time unit is a symbol is used. The time domain resource of the PDSCH and/or the PUSCH for small data transmission specifically use the following indication manner: indicating a period of small data transmission, where the period is represented by a quantity of slots, indicating one or more slots for small data transmission in the period, and indicating one or more symbols for small data transmission in the slot. An indication manner of the plurality of slots is a starting slot+a slot length in the period, and an indication manner of the plurality of symbols is a starting symbol+a symbol length. The frequency domain resource of the PDSCH and/or the PUSCH for small data transmission use the following indication manner: indicating a frequency domain resource occupied by the PDSCH and/or the PUSCH in the BWP, for example, indicating in a manner of using a starting frequency location+a frequency domain length (for example, a starting RB location+an occupied RB length (quantity)), or a frequency domain length+an end frequency location, or directly indicating a starting frequency location+an end frequency location.

Referring to Table 1, a small data resource for each BWP includes: a resource for transmitting the small data in a configured grant CG manner, and/or a resource for transmitting the small data in a random access manner. Optionally, the small data resource for each BWP further includes a configuration of the target cell. The terminal device sends or receive small data to or from the target cell through the small data resource configured in each BWP. The target cell is a serving cell of the terminal device, a neighboring cell of the terminal device, or the like, which is not limited. For example, in a specific configuration, the configuration of the small data resource in Table 1 is: a CG resource 1/random access resource 2+a neighboring cell. In this case, in response to using the CG manner, the terminal device sends or receive the small data to or from the neighboring cell through the resource 1. In response to using the random access manner, the terminal device sends or receive the small data to or from the neighboring cell through the resource 2.

The configured grant CG is also referred to as an uplink configured grant. The configured grant means that uplink transmission of the terminal device does not schedule the network device, and the terminal device performs uplink transmission based on configuration information. The uplink configured grant includes two types: a type-1 uplink configured grant and a type-2 uplink configured grant. A difference lies in that all parameters in the type-1 uplink configured grant are preconfigured by the network device. Therefore, in response to sending uplink service data using the type-1 uplink configured grant, the terminal device directly uses the parameters configured by the network device without additional scheduling information. In response to sending uplink service data using the type-2 uplink configured grant, the terminal device needs to additionally receive a piece of trigger information to perform uplink data transmission. The trigger information is DCI.

As shown in FIG. 5*a*, for the 4-step random access manner, the terminal device carries the small data in the Msg3. As shown in FIG. 5*b*, for the 2-step random access manner, the terminal device carries the small data in the MsgA. Optionally, in addition to the small data, the Msg3 and the MsgA further carry an identifier of the terminal device.

In at least one embodiment, the resource for sending the small data to the neighboring cell on the BWP is configured. Before the resource for sending the small data to the neighboring cell is configured, a current serving cell requests, from the neighboring cell, a small data resource that is used on the BWP frequency band. After the neighboring cell notifies the serving cell of the small data resource that is used on the BWP frequency band, the serving cell configures the corresponding small data resource for the terminal device, to send the small data resource to the neighboring cell on the BWP. Optionally, after the configuration is completed, the serving cell notifies the neighboring cell of small data resources to be sent to the neighboring cell that are configured for the terminal device. The neighboring cell correspondingly detects the small data on the small data resource.

Figure 8:
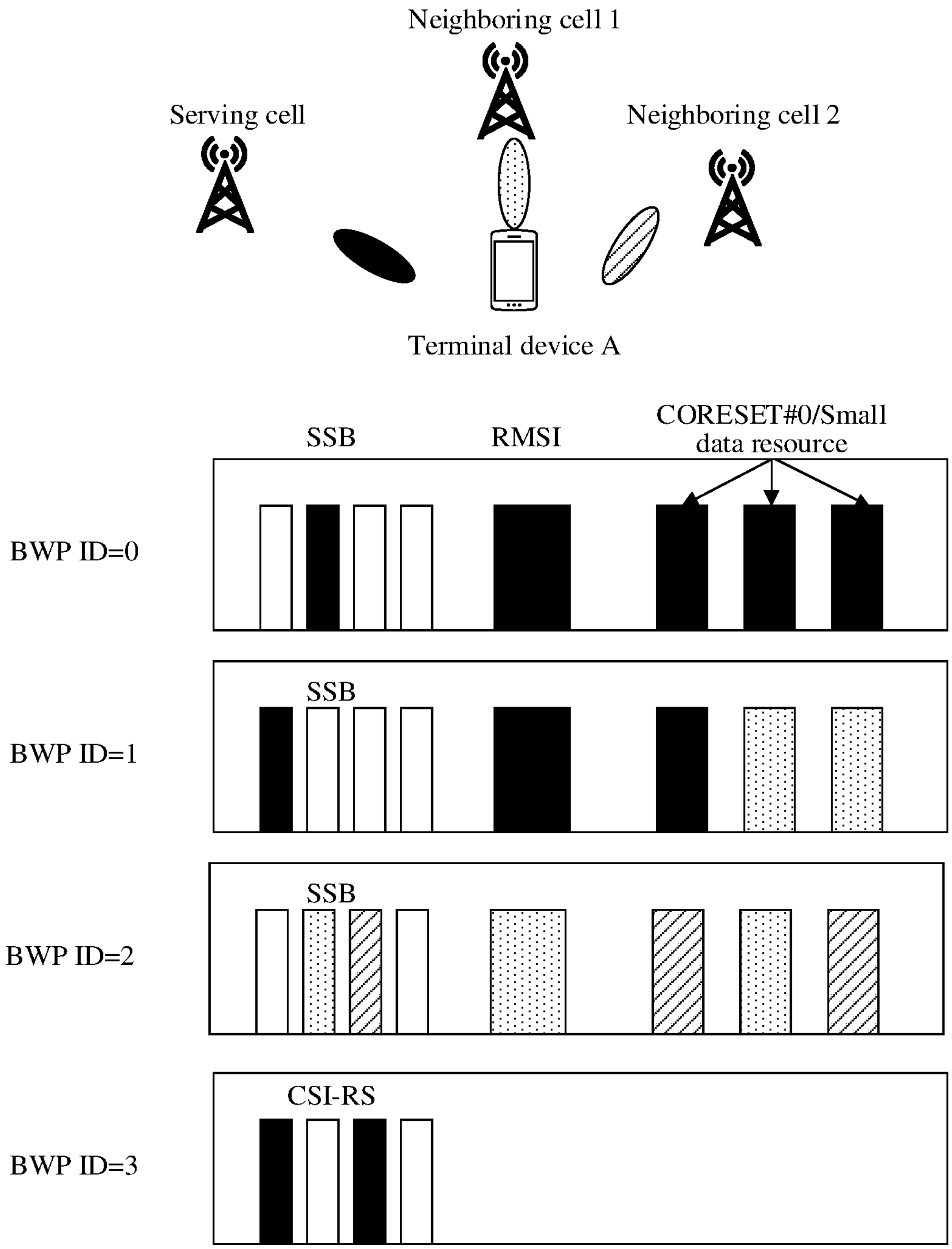
FIG. 8 is a schematic diagram of BWP configuration according to at least one embodiment.

FIG. 8 is used as an example to describe the configuration for measuring a neighboring cell. For example, 4 BWPs shown in FIG. 8 are configured for a terminal device A to camp on in a non-connected state, and the 4 BWPs are sequentially numbered 0 to 3 from top to bottom. In the foregoing BWPs, a part filled with black represents a resource configured for the serving cell, a part filled with gray represents a resource configured for a neighboring cell 1, and a part filled with slashes represents a resource configured for a neighboring cell 2. A part filled with white represents an SSB that is not configured for measurement.

From FIG. 8, in BWP ID=0, a resource of an SSB of the serving cell, a resource of remaining minimum system information (remaining minimum system information, RMSI) of the serving cell, a CORESET #0 or a small data resource of the serving cell, and the like are configured. Optionally, a BWP whose BWP ID is 0 is an initial BWP of the current serving cell.

In BWP ID=1, the resource of the SSB of the serving cell, the resource of the RMSI of the serving cell, CORESET #0 or small data resources of the serving cell and the neighboring cell 1, and the like are configured.

In BWP ID=2, resources of SSBs of the neighboring cell 1 and the neighboring cell 2, a resource of RMSI of the neighboring cell 1, CORESET #0 or small data resources of the neighboring cell 1 and the neighboring cell 2, and the like are configured.

In BWP ID=3, a resource of a CSI-RS and the like of the serving cell are configured.

From FIG. 8, the terminal device A measures the SSB of the serving cell in BWP ID=0 and BWP ID=1, and measures the CSI-RS of the serving cell in BWP ID=3. However, no reference signal of the serving cell is configured in BWP ID=2 for measurement. The SSBs of the neighboring cell 1 and the neighboring cell 2 is measured in a frequency band of BWP ID=2. Time-frequency resources for measuring the SSBs of the neighboring cell 1 and the neighboring cell 2 are provided in the configuration of BWP ID=2. Optionally, the time-frequency resources for the SSBs of the neighboring cell 1 and the neighboring cell 2 is configured for the terminal device through a BWP configuration parameter whose BWP ID is 2. The BWP configuration parameter further includes functions of reference signals of the neighboring cell 1 and the neighboring cell 2, for example, whether the reference signal is for determining whether a TA is valid, and/or whether the reference signal is for cell reselection.

In at least one embodiment, the foregoing parameters of the BWP are configured through the RRC release message, the downlink unicast data packet in the inactive state, the broadcast message, the system information, or the like. For details, refer to the foregoing records. Details are not described herein again.

Step 701: The terminal device receives a first message from the network device, where the first message is for indicating the second BWP. Optionally, the second BWP is any one of the one or more BWPs configured in step 700. Alternatively, the first message in step 701 includes a configuration parameter of the second BWP. The configuration parameter of the second BWP carried in the first message is the same as that described in Table 1. That is, the first message is for indicating at least one of following content in the second BWP: an identifier of the BWP; a measurement parameter; the BWP switch period; use of the BWP for uplink and/or downlink transmission; and a time-frequency resource for small data transmission in the BWP. In addition, the first message is further for indicating a cell corresponding to the second BWP or a cell in which the second BWP is located.

In at least one embodiment, the first message in step 701 is carried in DCI, and the first message is for indicating at least one of the following content:

(1) Identifier of second BWP. Optionally, the identifier of the second BWP is an ID of the second BWP. As described above, the identifier corresponding to each BWP is configured in the RRC release message, or configured in the system information, or configured in the information carried in the PDSCH. Optionally, the identifier of the second BWP occupies X1 bits, and a value corresponding to X1 indicates an absolute value of the ID of the second BWP, or indicate an ID offset relative to the current first BWP.

(2) Information about terminal device that uses BWP switching. Optionally, the information about the terminal device that use BWP switching occupies X2 bits. For multicast communication, in response to the network device expecting some terminal devices in a terminal group to perform BWP switching, the network device indicates several terminal devices in the terminal group to form a group to perform BWP switching. Grouping information is a value related to an ID of the terminal device. For example, in response to the X2 bits being 4 bits, a terminal device whose first positive integer (for example, 2, 4, or another value) bits or last positive integer (for example, 2, 4, or another value) bits of the ID of the terminal device are the same as a value of X2 performs BWP switching.

(3) Type of terminal device that uses BWP switching. The type of the terminal device that uses BWP switching occupies X3 bits. For example, in response to the X3 bits being 1 bit, and a value of X3 is "1", a REDCAP terminal device is indicated to perform BWP switching. In response to the value being "0", a non-REDCAP terminal device is indicated to perform BWP switching. For another example, in response to the X3 bits being 1 bit and the value of X3 is "1", one subtype of the REDCAP terminal device is indicated to perform BWP switching; and in response to the value being "0", another subtype of the REDCAP terminal device is indicated to perform BWP switching. Different subtypes of the REDCAP terminal device are distinguished based on one or more of a maximum bandwidth supported by the terminal, a quantity of antennas, a signal processing capability, a delay capability of scheduling and transmission, or a full-duplex capability, or are distinguished based on another capability related to software and hardware of the terminal, which is not limited herein. For detailed descriptions of the REDCAP terminal device and the non-REDCAP terminal device, refer to the records in the seventh part of the foregoing term explanation. Alternatively, the X2 bits and the X3 bits jointly indicate a terminal device for BWP switching. For example, an example in which X2 is 4 and X3 is 1 is used. In response to the value of X3 being "1" (binary), a terminal device whose first 4 bits of an ID of the terminal device are the same as the value of X2 is indicated to perform BWP switching. In response to the value of X3 being "0" (binary), a terminal device whose last 4 bits of an ID of the terminal device are the same as the value of X2 is indicated to perform BWP switching. In the following descriptions, values with quotation marks, for example, "0" and "1", both represent binary, and values without quotation marks represent decimal, hexadecimal, or the like.

(4) BWP switch period. In at least one embodiment, a plurality of BWP switch periods are preconfigured in Table 1, and one of the BWP switch periods is indicated in the DCI. Alternatively, in at least one embodiment, for the second BWP, BWP switching is not performed through the BWP switch period configured in Table 1, and a new BWP switch period is indicated in the DCI to perform BWP switching. As described above, the BWP switch period includes a BWP switching period and a period for specifically performing BWP switching. For example, in response to the preconfigured BWP switching period being 5 ms, a first BWP switching period is the $0^{th}$ ms to the $5^{th}$ ms after the terminal enters the RRC-non-connected state, a second BWP switching period is the $5^{th}$ ms to the $10^{th}$ ms, a third BWP switching period is the $10^{th}$ ms to the $15^{th}$ ms, and so on. For the period for specifically indicating BWP switching, the terminal device performs switching in a current period after receiving the DCI, or performs switching in a plurality of periods after the current period. Optionally, the BWP switch period occupies X4 bits, and the indicated switching period is: the current period+N periods. N is a value expressed by the X4 bits, and N is greater than or equal to 0. For example, when X4="0" (binary), N=0, and the terminal device is indicated to perform BWP switching in the current period. In response to X4="11" (binary), N=3, and the terminal device is indicated to perform BWP switching in the third period following the current period.

Certainly, content carried in the DCI is merely an example for description, and is not intended to limit embodiments described herein. For example, in at least one embodiment, in addition to the foregoing content, the DCI further carries the cell corresponding to the second BWP, and/or a time-frequency resource for small data communication in the second BWP. Main reasons for the time-frequency resource for small data communication in the second BWP carried in the DCI are as follows: First, there are a plurality of time-frequency resources for small data communication in each BWP configured in Table 1, and a specific time-frequency resource for small data transmission is indicated to the terminal device through the DCI. Second, the terminal device does not use the time-frequency resources configured in Table 1 to perform BWP communication, but re-indicate a new time-frequency resource through the DCI to perform BWP communication.

In at least one embodiment, the DCI is first-type DCI, and the first-type DCI is for carrying indication information of one or more terminal devices for BWP switching. Optionally, the first-type DCI is also referred to as multicast DCI. The first-type DCI includes DCI scrambled by a P-RNTI or DCI scrambled by an SI-RNTI.

The DC scrambled by the P-RNTI, referred to as P-DCI for short below, is for scheduling a PDSCH carrying the information for paging. The P-RNTI is hexadecimal, and a value range thereof is from 0001 to FFFF. A DC format is a format format1_0. As shown in Table 2, specific fields include:

TABLE 2

Fields of the DCI scrambled by the P-RNTI

| Field sequence number | Field | Indicated content | Quantity of bits |
|---|---|---|---|
| 1 | Short message indicator (short message indicator) | Short message identifier | 2 |
| 2 | Short message (short message) | Short message content | 8 |
| 3 | Frequency domain resource assignment (frequency domain resource assignment) | Frequency domain resource | $\lceil \log_2(N_{RB}^{DL,BWP}(N_{RB}^{DL,BWP}+1)/2) \rceil$ $N_{RB}^{DL,BWP}$ is a quantity of RBs of CORESET#0 |
| 4 | Time domain resource assignment (time domain resource assignment) | Time domain resource | 4 |
| 5 | VRB-to-PRB mapping (VRB-to-PRB mapping) | VRB-to-PRB mapping relationship | 1 |
| 6 | Modulation and coding scheme (modulation and coding scheme) | Modulation and coding scheme | 5 |
| 7 | Transmit block size (TB scaling, or TB size) | Transmit block size | 2 |
| 8 | Reserved bit (reserved bits) | Reserved | 8 |

As shown in Table 3, at least one embodiment of information indicated in 2 bits in the "short message indicator" includes:

TABLE 3

Information indicated by the "short message indicator" field

| Bit field (Bit field) | Short message indicator (short message indicator) |
|---|---|
| 00 | Reserved (reserved) |
| 01 | Only scheduling information for paging is present in the DCI (only scheduling information for paging is present in the DCI) |
| 10 | Only short message is present in the DCI (only short message is present in the DCI) |
| 11 | Both scheduling information for paging and a short message are present in the DCI (both scheduling information for paging and short message are present in the DCI) |

In response to the "short message indicator" field indicating "01", the P-DCI is only for scheduling information for paging. 8 bits of the "short message" field in the field sequence number 2 in Table 1 have no indication meaning, and the fields such as "frequency domain resource assignment", "time domain resource assignment", "VRB-to-PRB mapping", "VRB-to-TRB mapping", and "transmit block size" are for indicating a transmission parameter of a PDSCH carrying the information for paging. In response to the "short message indicator" field indicating "10", the P-DCI is only for scheduling the short message, and the fields such as "frequency domain resource assignment", "time domain resource assignment". "VRB-to-PRB mapping", "VRB-to-TRB mapping", and "transmit block size" have no indication meaning. In response to the "short message indicator" field indicating "11", the P-DCI not only schedules the information for paging, but also indicates the short message. In addition, "00" in the field is reserved and has no indication meaning. In addition, 8 bits in the P-DCI are used as reserved fields and have no indication meaning.

In at least one embodiment, a "00" state of the "short message indicator" field is used to indicate any one of the following meanings:

The "00" state indicates that the P-DCI is only for indicating BWP switching. In this case, the field sequence numbers 2 to 8 in Table 2 have no specific indication meaning and are for indicating BWP switching.

The "00" state indicates that the P-DCI indicates both BWP switching and the short message. In this case, the field sequence numbers 3 to 8 in Table 2 have no specific indication meaning and are for indicating BWP switching.

The "00" state indicates that the P-DCI indicates both BWP switching and the information for paging. In this case, 16 bits in total of field sequence numbers 2 and 8 in Table 2 have no specific indication meaning and are for indicating BWP switching.

The "00" state indicates that the P-DCI indicates BWP switching, the short message and the information for paging. In this case, the 8-bit reserved field whose field sequence number is 8 in Table 2 has no specific indication meaning and are for indicating BWP switching.

The "00" state indicates that the P-DCI indicates the information for paging, and the information for paging includes a BWP switching indication.

In the foregoing cases, assuming that a total quantity of bits that is for indicating BWP switching is X, X1 bits in the X bits are for indicating the ID of the second BWP.

Optionally, X2 bits in the X bits are for indicating the grouping information. In response to the grouping information being preconfigured, for example, when all terminals paged by the information for paging are preconfigured to perform BWP switching, the grouping information is not indicated in the P-DCI.

Optionally, X3 bits in the X bits are for indicating the type of the terminal device. In response to the type of the terminal device being preconfigured, for example, all types of terminals are preconfigured to perform BWP switching, or the REDCAP terminal is preconfigured to perform BWP switching, or one or more subtypes of the REDCAP terminal are preconfigured to perform BWP switching, the type of the terminal device is not indicated in the P-DCI.

Optionally, X4 bits in the X bits are for indicating the BWP switch period. In response to the BWP switch period being preconfigured, for example, switching is preconfigured to be performed in a next slot after the P-DCI is received, or switching is preconfigured to be performed in a next period, the BWP switch period is not indicated in the P-DCI.

For detailed information about X2, X3, and X4, refer to the foregoing records. X1+X2+X3+X4≤X, and X2, X3 and X4 bits are defaulted. A specific length and meaning of each bit is configured in the BWP parameter in Table 1. For example, in at least one embodiment, a new row is added to the BWP parameter in Table 1, to indicate the lengths and the meanings of the X2, X3, and X4 bits.

The DCI scrambled by the SI-RNTI is for scheduling a PDSCH carrying system information block (system information block, SIB). The SI-RNTI is hexadecimal, a value range thereof is from 0000 to FFFF, and a DCI format is format_1. Specific fields include:

TABLE 4

Fields of the DCI scrambled by the SI-RNTI

| Field | Indicated content | Quantity of bits |
|---|---|---|
| Frequency domain resource assignment (frequency domain resource assignment) | Frequency domain resource | $\lceil \log_2(N_{RB}^{DL,BWP}(N_{RB}^{DL,BWP}+1)/2) \rceil$ <br> $N_{RB}^{DLB,BWP}$ is a quantity of *RBs* of CORESET 0 |
| Time domain resource assignment (time domain resource assignment) | Time domain resource | 4 |
| VRB-to-PRB mapping (VRB-to-PRB mapping) | VRB-to-PRB mapping relationship | 1 |
| Modulation and coding scheme (modulation and coding scheme) | Modulation and coding scheme | 5 |
| Redundancy version (redundancy version) | Redundancy version | 2 |
| System information indicator (system information indicator) | System information indicator | 1 |
| Reserved field (reserved bits) | Reserved field | 15 |

In at least one embodiment, 15 bits in the reserved field in Table 4 are used to indicate BWP switching. In addition, X2+X3+X4≤15 bits. For specific meanings of X2, X3, and X4, refer to the foregoing records. The X2, X3, and X4 bits are defaulted. A specific length and meaning of each bit are configured in the BWP parameter. For example, in at least one embodiment, a new row is added to the BWP parameter in Table 1, to indicate the lengths and the meanings of the X2, X3, and X4 bits.

In at least one embodiment, the DCI is second-type DCI, and the second-type DCI is for carrying indication information used by a terminal device for BWP switching. The second-type DCI includes a PDCCH order (order), DCI for scheduling downlink small data, DCI for scheduling a random access response, DCI for scheduling an ACK/NACK feedback for a configured grant CG, or the like.

Optionally, the second-type DCI is also be referred to as unicast DCI. A terminal device in an idle state and a terminal device in an inactive state detect the unicast DCI in a random access process. The unicast DCI is the DCI for scheduling a random access response (random access response, RAR), DCI scrambled by an RA-RNTI for scheduling a Msg2, DCI scrambled by a TC-RNTI for scheduling a Msg4, DCI scrambled by an RNTI for scheduling a MsgB, or the like. For the Msg2, the Msg4, and the MsgB, refer to the records in the fifth part of the foregoing term explanation. Optionally, the terminal device in the inactive state further detects the DCI for scheduling downlink small data, DCI for scheduling a downlink feedback for uplink small data, a PDCCH order for triggering random access, and the like. Therefore, the unicast DCI is also the DCI for scheduling downlink small data, the DCI for scheduling downlink feedback for uplink small data, a PDCCH order for triggering random access and providing a preamble for the random access, or the like.

In the foregoing unicast DCI, several bits is also used to indicate BWP switching. Compared with indicating BWP switching through the multicast DCI, the unicast DCI does not need to indicate the grouping information, and indicates only X1 and/or X4 bits in the P-DCI. The meanings of the bits are substantially the same as those in the foregoing corresponding content, and details are not described again. Certainly, for the unicast DCI, in addition to X1 and/or X4, the cell corresponding to the second BWP, the time-frequency resource for small data communication in the second BWP, and/or the like are further indicated, which is not limited.

In at least one embodiment, an idle bit in the multicast or unicast DCI of the terminal device in the non-connected state is used to achieve a technical effect that the network device indicates the terminal device in the non-connected state to perform BWP switching.

In at least one embodiment, the first message in step 701 is carried in a PDSCH, and the PDSCH is for carrying at least one of following information: information for paging, system information, a random access response, an ACK/NACK feedback for a CG, or downlink small data. The PDSCH includes a multicast PDSCH and a unicast PDSCH. The multicast PDSCH is a PDSCH sent to one or more terminal devices. DCI for scheduling the multicast PDSCH is usually scrambled by a common and not terminal-specific RNTI, for example, a P-RNTI, an SI-RNTI, or an RA-RNTI. Information carried on the multicast PDSCH includes the information for paging, the system information, the Msg2, or the like. The unicast PDSCH refers to a PDSCH sent to a specific terminal device. DCI for scheduling the unicast PDSCH is usually scrambled by DCI exclusive to the terminal device. Information carried on the unicast PDSCH includes the RAR, the MsgB, the Msg4, the ACK/NACK feedback transmitted through CG, the downlink small data, or the like. For the RAR, the MsgB, and the Msg4, refer to the records in the fifth part of the foregoing term explanation. For a paging process, refer to the records in the fourth part of the foregoing term explanation.

In at least one embodiment, referring to the following code in bold, the first message is for indicating at least one of the following content:

```
        PagingRecord :=         SEQUENCE {
            ue-Identity                  PagingUE-Identity,              -- ID of the paged
terminal
            access Type                ENUMERATED {non3GPP}   -- access manner of the
paged terminal
            ...
            Resident BWP           BWP-ID
            Switch Period             NumOfPeriod                    OPTIONAL
            ServingCell            Cell-ID or simplified-ID          OPTIONAL
            SmallDataConfig      Config-ID                          OPTIONAL
        }
```

(1) The identifier of the second BWP is also referred to as an ID of a resident BWP (resident BWP), and indicates the ID of the second BWP. Optionally, the ID of the to-be-switched second BWP is indicated in a form of a BWP-ID.

(2) The BWP switch period is also referred to as a switch period. As described above, a plurality of BWP switch periods is preconfigured through Table 1, and one of the BWP switch periods is indicated through the PDSCH to perform switching. Alternatively, the PDSCH is directly used to indicate a new BWP switch period to perform BWP switching.

(3) The cell corresponding to the second BWP is also referred to as a serving cell, which is a cell on which the terminal device camps after the terminal device is indicated to switch to the second BWP. For example, a cell ID or a simplified cell ID is used to indicate a cell on which the terminal device camps after the terminal device switches to the second BWP.

(4) The resource for small data communication in the second BWP is also referred to as a small data config (small data config), and indicates a resource for small data transmission in the second BWP, which is indicated in a form of a resource sequence number. As described above, a plurality of resources for small data communication is preconfigured through Table 1, and one of the small data resources is indicated through the PDSCH to perform small data transmission. Alternatively, the PDSCH is directly used to indicate a new small data resource for small data transmission.

(5) Information about terminal device that uses BWP switching. In response to the PDSCH being a multicast PDSCH, this parameter is included. The description of this parameter is the same as that described above. Details are not described again.

(6) Type of terminal device that uses BWP switching. In response to the PDSCH being a multicast PDSCH, this parameter is included. The description of this parameter is the same as that described above. Details are not described again.

Optionally, because the PDSCH carries more information than the DCI, the PDSCH directly indicates some or all parameters of the second BWP. For example, the PDSCH carries the parameters configured in Table 1 (such as, the identifier of the second BWP, the measurement parameter, the BWP switch period, use of the second BWP for uplink and/or downlink transmission, the time-frequency resource for small data transmission in the second BWP, or the like), the cell corresponding to the second BWP, or the like.

Step 702: The terminal device switches from the first BWP to the second BWP. Optionally, the first BWP is an initial BWP, a non-initial BWP, or the like, which is not limited. From the foregoing records, the BWP switch period is preconfigured. After receiving the first message in step 701, the terminal device switches to the second BWP within this BWP switch period. Alternatively, after receiving the first message in step 701, the terminal device switches to the second BWP within a subsequent one or more BWP switch periods.

Optionally, step 703: The terminal device transmits small data, a reference signal, or the like with the network device on the second BWP. Optionally, for a process of transmitting small data between the terminal device in the inactive state and the network device, refer to the records in the sixth part of the foregoing term explanation.

In at least one embodiment, for the terminal device in the non-connected state, the BWP on which the terminal device camps is switched through the first message, which resolves the problem of resource congestion of the initial BWP caused when all the terminal devices in the non-connected state camp on the initial BWP.

Figure 9:
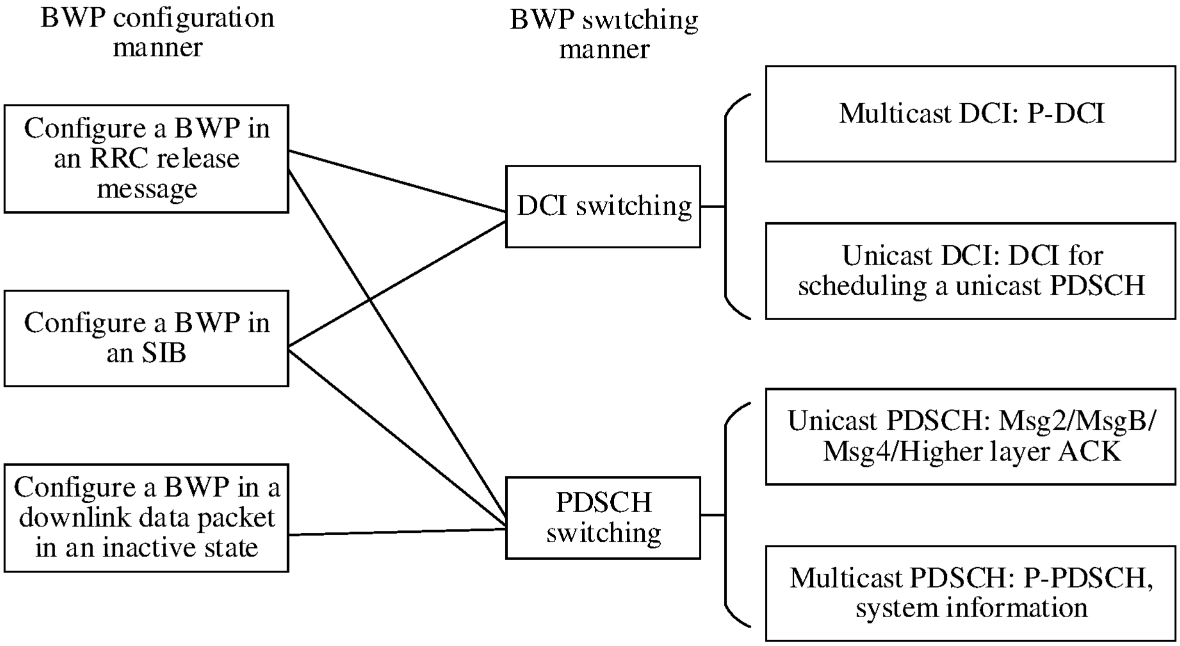
FIG. 9 is a schematic diagram of BWP configuration and switching according to at least one embodiment.

In at least one embodiment, as shown in FIG. 9, a network device configures one or more BWPs for a terminal device through an RRC release message, system information (such as an SIB), a downlink data packet in an inactive state, or the like. Then, the terminal device is indicated to perform BWP switching through DCI, a PDSCH, or the like. Optionally, a to-be-switched BWP indicated through the DCI, the PDSCH, or the like is at least one of the one or more preconfigured BWPs. The DCI includes multicast DCI and unicast DCI, the multicast DCI includes P-DCI, and the unicast DCI includes DCI for scheduling a unicast PDSCH. The PDSCH includes the unicast PDSCH and a multicast PDSCH. The unicast PDSCH includes a PDSCH carrying a Msg2, a MsgB, a Msg4, or an ACK/NACK feedback. The multicast PDSCH includes a P-PDSCH, a PDSCH carrying system information, or the like.

For example, still referring to FIG. 9, when configuring one or more BWPs through the RRC release message, the system information (such as the SIB), or the like, the network device indicates BWP switching through the DCI. In response to configuring one or more BWPs through the RRC release message, the system information SIB, the downlink data packet in the inactive state, or the like, the network device indicates BWP switching through the DCI or the PDSCH.

Figure 10:
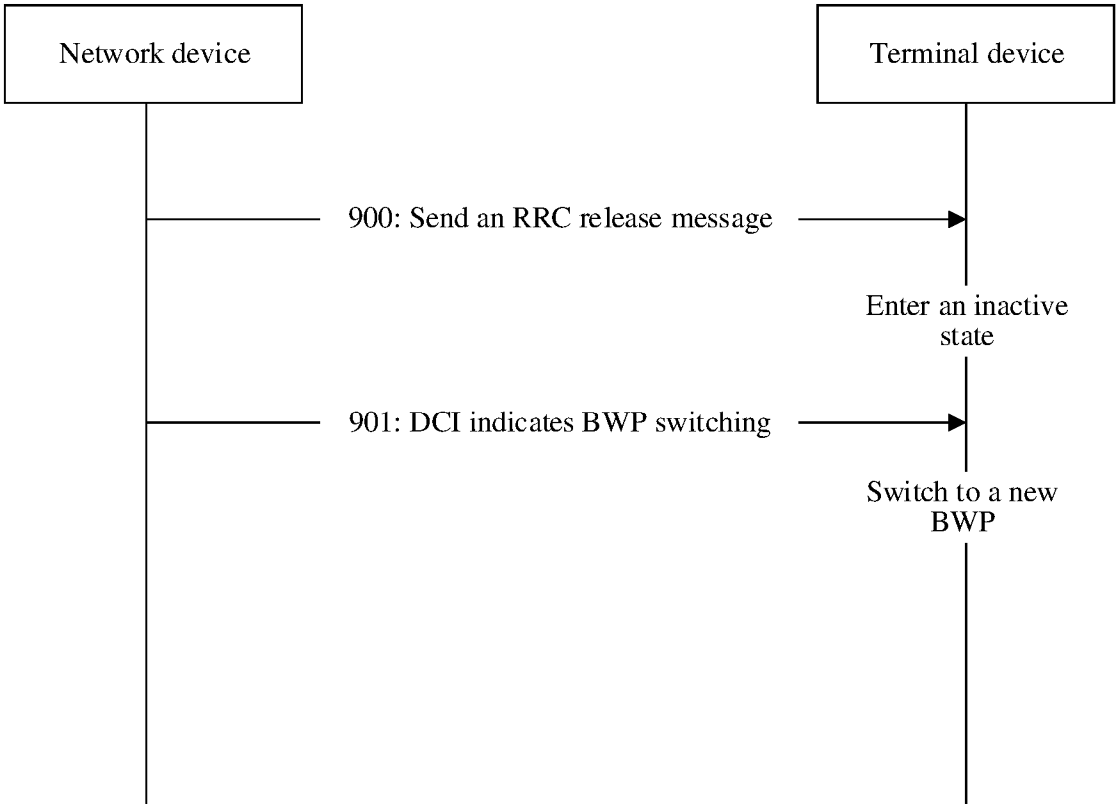
FIG. 10 is a schematic diagram of BWP switching according to at least one embodiment.

As shown in FIG. 10, a flowchart of indicating BWP switching through DCI is provided. The method includes at least the following steps.

Step 900: A network device sends an RRC release message to a terminal device, where the RRC release message is for notifying the terminal device to enter an inactive state. Optionally, the RRC release message carries indication information of a BWP on which the terminal device camps.

Optionally, the method further includes: The network device configures one or more BWPs for the terminal device. For example, the one or more BWPs are configured through the RRC release message in step 900, or are configured through system information, or are configured in a unicast or multicast data packet carried in a PDSCH, which is not limited. The system information is received by the terminal device before entering the inactive state, or is received by the terminal device after entering the inactive state, which is not limited.

Step 901: The network device indicates BWP switching through DCI. Because information carried in the DCI is limited, the switched BWP indicated by the DCI is a BWP in the one or more configured BWPs. The DCI is multicast DCI, unicast DCI, or the like, which is not limited. In at least one embodiment, an idle bit in the multicast DCI or the unicast DCI is used to indicate BWP switching. For example, the idle bit in the multicast DCI or the unicast DCI is X bits. In the X bits, X1 bits indicates an ID of a to-be-switched BWP, X2 bits indicate grouping information, X3 bits indicate a type of the terminal device, and X4 bits are for indicating a BWP switch period. X1, X2, X3, and X4 are configured by default, which are not limited.

In at least one embodiment, for a terminal device in a non-connected state, the idle bit in the multicast or unicast DCI is used to achieve a technical effect of indicating the terminal device in the non-connected state to perform BWP switching by a network side and avoiding resource congestion of an initial BWP.

Figure 11:
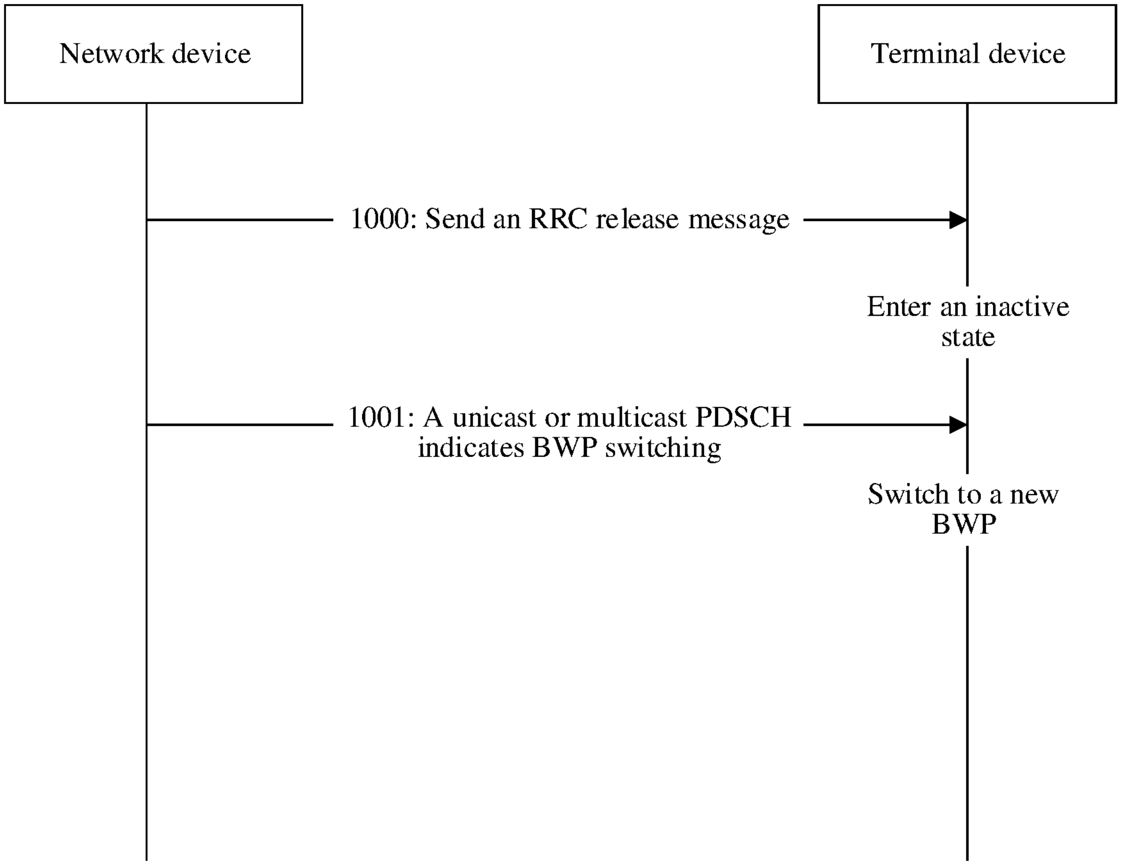
FIG. 11 is another schematic diagram of BWP switching according to at least one embodiment.

As shown in FIG. 11, a flowchart of indicating BWP switching through PDSCH is provided. The method includes at least the following steps.

Step 1000: A network device sends an RRC release message to a terminal device, where the RRC release message is for notifying the terminal device to enter an inactive state. Optionally, the RRC release message carries indication information of an initial BWP on which the terminal device camps.

Optionally, the method further includes: The network device configures one or more BWPs for the terminal device. For example, the one or more BWPs are configured through the RRC release message, or are configured through system information, or are configured through a unicast or multicast data packet carried in a PDSCH, or the like. The system information is received by the terminal device before entering the inactive state, or is received by the terminal device after entering the inactive state, which is not limited.

Step 1001: The network device indicates BWP switching through the PDSCH, where the PDSCH is a multicast PDSCH or a unicast PDSCH. A target of BWP switching is a BWP in the one or more preconfigured BWPs. Alternatively, the target of BWP switching is a BWP corresponding to a BWP parameter carried in the PDSCH in step 1001, and the BWP parameter carried in the PDSCH is similar to the preconfigured BWP parameter. After receiving the unicast or multicast PDSCH, the terminal device switches to a corresponding target BWP.

In at least one embodiment, for a terminal device in a non-connected state, the multicast or unicast PDSCH is used for indicating a parameter of BWP switching, thereby achieving a technical effect that the network device indicates the terminal device in the non-connected state to perform BWP switching.

The method provided at least one embodiment is described above in detail with reference to FIG. 1 to FIG. 11. An apparatus provided at least one embodiment is described in detail below with reference to FIG. 12 and FIG. 13. It should be understood that the descriptions of the apparatus embodiments correspond to the descriptions of the method embodiments. For content not described in detail, refer to the descriptions in the foregoing method embodiments. To implement functions in the method provided at least one embodiment, a network device and a terminal device includes a hardware structure and/or a software module, to implement the foregoing functions in a form of the hardware structure, the software module, or the hardware structure plus the software module. Whether one of the foregoing functions is performed in the form of the hardware structure, the software module, or the hardware structure plus the software module depends on a specific application and design constraints of the technical solutions.

Figure 12:
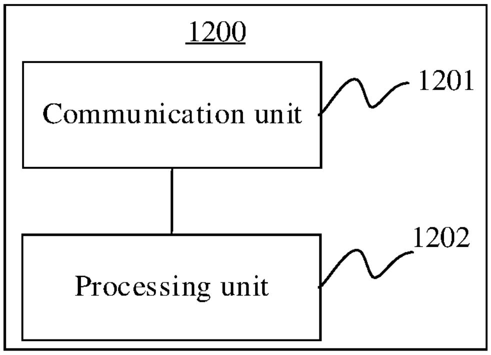
FIG. 12 is a schematic diagram of a structure of an apparatus according to at least one embodiment.

FIG. 12 is a schematic block diagram of an apparatus 1200 according to at least one embodiment. The apparatus is configured to implement functions of the terminal device or the network device in the foregoing method embodiments. The apparatus is a software unit, a hardware circuit, a software unit+a hardware circuit, a chip system, or the like, which is not limited. The chip system includes a chip, or includes a chip and another discrete device. The apparatus includes a communication unit 1201, configured to communicate with the outside. The apparatus further includes a processing unit 1202, configured to perform processing.

In an example, the apparatus 1200 is configured to implement operations of the terminal device in the foregoing method embodiments. The apparatus 1200 is a terminal device, or is a chip, a circuit, or the like configured in a terminal device. The communication unit 1201 is configured to perform sending/receiving-related operations of the terminal device in the foregoing method embodiments, and the processing unit 1202 is configured to perform processing-related operations of the terminal device in the foregoing method embodiments.

For example, the communication unit 1201 is configured to receive a first message from a network device, where the first message is for indicating a second BWP, the terminal device camps on a first bandwidth part BWP, and the terminal device is in a non-connected state. The processing unit 1202 is configured to switch from the first BWP to the second BWP.

Optionally, the first message is carried in downlink control information DCI, and the DCI is first-type DCI, including DCI scrambled by a paging radio network temporary identifier P-RNTI or DCI scrambled by a system information radio network temporary identifier SI-RNTI; or the DCI is second-type DCI, including a physical downlink control channel PDCCH order (order), DCI for scheduling a PDSCH, DCI for scheduling a random access response, or DCI for scheduling an ACK/NACK feedback for a configured grant CG.

Optionally, the first message is carried in a PDSCH, and the PDSCH is for carrying at least one of following information: information for paging, system information, a random access response, an ACK/NACK feedback for a CG, or downlink small data.

Optionally, the first message is for indicating at least one of following content: an identifier of the second BWP, information about a terminal device that uses BWP switching, a type of the terminal device that uses BWP switching, a BWP switch period, a cell corresponding to the second BWP, and a resource for small data communication in the second BWP.

Optionally, the communication unit 1201 is further configured to receive a second message from a network device. The second message is for configuring one or more BWPs for the terminal device, and the one or more BWPs include the second BWP.

Optionally, the second message includes an RRC release message, system information, or a message carried in a PDSCH.

Optionally, the second message is for indicating at least one of following content in each of the one or more BWPs: an identifier of the BWP; a measurement parameter; the BWP switch period; use of the BWP for uplink and/or downlink transmission; and a time-frequency resource for small data transmission in the BWP.

Optionally, the first message is further for indicating at least one of following content in the second BWP: an identifier of the BWP; a measurement parameter; the BWP switch period; use of the BWP for uplink and/or downlink transmission; a time-frequency resource for small data transmission in the BWP; and a cell corresponding to the BWP.

Optionally, the measurement parameter includes a type of a measured reference signal; cell information of the reference signal; a time-frequency resource location of the reference signal; and a function of the reference signal.

Optionally, the function of the reference signal includes determining whether a timing advance TA is valid or whether to perform cell reselection.

In another example, the apparatus 1200 is configured to implement operations of the network device in the foregoing method embodiments. The apparatus 1200 is a network device, or is a chip or a circuit configured in a network device. The communication unit 1201 is configured to perform sending/receiving-related operations of the network device in the foregoing method embodiments, and the processing unit 1202 is configured to perform processing-related operations of the network device in the foregoing method embodiments.

For example, the processing unit 1202 is configured to generate a first message. The communication unit 1201 is configured to send the first message to a terminal device, where the terminal device camps on a first bandwidth part BWP, the terminal device is in a non-connected state, and the first message is for indicating the terminal device to switch from the first BWP to a second BWP.

Optionally, the communication unit 1201 is further configured to send or receive small data or a reference signal to/from the terminal device on the second BWP.

Optionally, the first message is carried in downlink control information DCI, and the DCI is first-type DCI, including DCI scrambled by a paging radio network temporary identifier P-RNTI or DCI scrambled by a system information radio network temporary identifier SI-RNTI; or the DCI is second-type DCI, including a physical downlink control channel PDCCH order (order), DCI for scheduling a PDSCH, DCI for scheduling a random access response, or DCI for scheduling an ACK/NACK feedback for a configured grant CG.

Optionally, the first message is carried in a physical downlink shared channel PDSCH, and the PDSCH is for carrying at least one of following information: information for paging, system information, a random access response, an ACK/NACK feedback for a CG, or downlink small data.

Optionally, the first message is for indicating at least one of following content: an identifier of the second BWP, information about a terminal device that uses BWP switching, a type of the terminal device that uses BWP switching, a BWP switch period, a cell corresponding to the second BWP, and a resource for small data communication in the second BWP.

Optionally, the communication unit 1201 is further configured to send a second message to the terminal device. The second message is for configuring one or more BWPs for the terminal device, and the one or more BWPs include the second BWP.

Optionally, the second message includes a radio resource control RRC release message, system information, or a message carried in a PDSCH.

Optionally, the second message is for indicating at least one of following content in each of the one or more BWPs: an identifier of the BWP; a measurement parameter; the BWP switch period; use of the BWP for uplink and/or downlink transmission; and a time-frequency resource for small data transmission in the BWP.

Optionally, the first message is further for indicating at least one of following content in the second BWP: an identifier of the BWP; a measurement parameter; the BWP switch period; use of the BWP for uplink and/or downlink transmission; a time-frequency resource for small data transmission in the BWP; and a cell corresponding to the BWP.

Optionally, the measurement parameter includes a type of a measured reference signal; cell information of the reference signal; a time-frequency resource location of the reference signal; and a function of the reference signal.

Optionally, the function of the reference signal includes determining whether a timing advance TA is valid or whether to perform cell reselection.

In at least one embodiment, the unit division is an example, is merely logical function division, and there are other division manners during actual implementation. In addition, functional units at least one embodiment are integrated into one processor, or each of the units exist alone physically, or two or more units are integrated into one unit. The integrated unit is implemented in a form of hardware, or is implemented in a form of a software functional unit.

A function of the communication unit in the foregoing embodiment is implemented by a communication interface, and a function of the processing unit is implemented by at least one processor. In at least one embodiment, the communication interface is a transceiver, a circuit, a bus, a module, a pin or other types of communication interfaces. In at least one embodiment, when the communication interface is a transceiver, the transceiver includes an independent receiver and an independent transmitter, or is a transceiver integrating a transceiver function, or is an interface circuit. For example, the transceiver includes a transmitter and/or a receiver for implementing functions of a transmitting unit and/or a receiving unit respectively. Descriptions are provided below with reference to FIG. 13 through examples.

Figure 13:
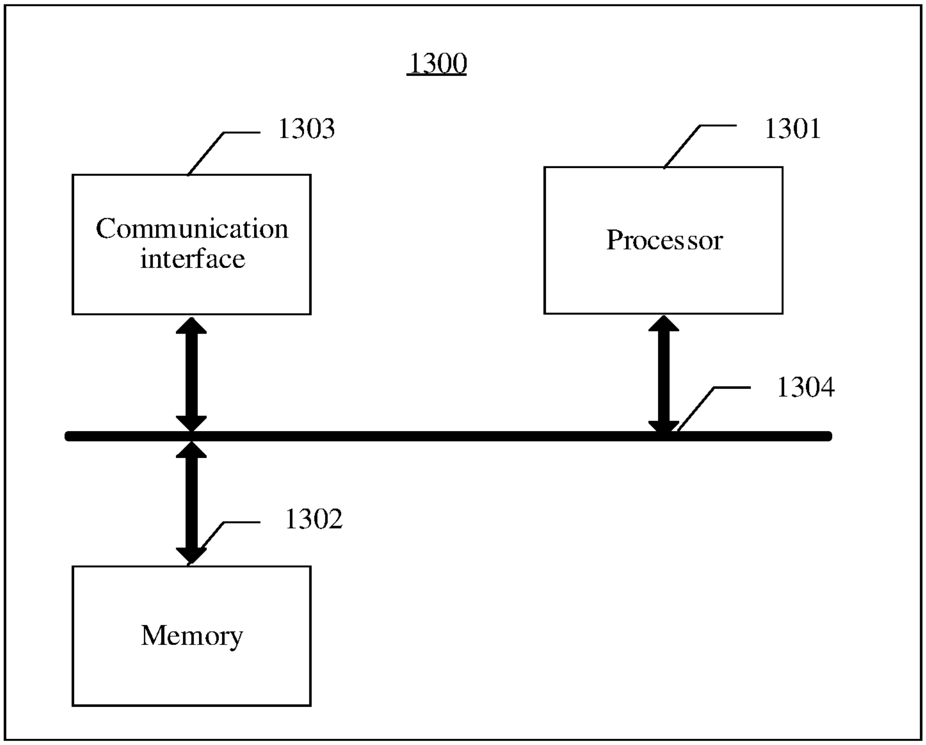
FIG. 13 is a schematic diagram of another structure of an apparatus according to at least one embodiment.

A communication apparatus 1300 shown in FIG. 13 includes at least one processor 1301. The communication apparatus 1300 further includes at least one memory 1302, configured to store program instructions and/or data. The memory 1302 is coupled to the processor 1301. The coupling in at least one embodiment is indirect coupling or a communication connection between apparatuses, units, or modules in an electrical form, a mechanical form, or another form, and is for information exchange between the apparatuses, the units, or the modules. The processor 1301 performs an operation cooperatively with the memory 1302. The processor 1301 executes the program instructions stored in the memory 1302. At least one of the at least one memory 1302 is included in the processor 1301.

The apparatus 1300 further includes a communication interface 1303, configured to communicate with another device through a transmission medium, so that the communication apparatus 1300 communicates with the another device.

It should be understood that connection media between the processor 1301, the memory 1302, and the communication interface 1303 are not limited in at least one embodiment. In at least one embodiment, in FIG. 13, the memory 1302, the processor 1301, and the communication interface 1303 are connected through a communication bus 1304. The bus is represented by a bold line in FIG. 13. A connection manner between other components is merely an example for description, and is not limited. The bus includes an address bus, a data bus, a control bus, and the like. For ease of representation, only one bold line is used to represent the bus in FIG. 13, but this does not mean that there is only one bus, only one type of bus, or the like.

In an example, the apparatus 1300 is configured to implement operations performed by the terminal device in the foregoing method embodiments. The communication interface 1303 is configured to perform sending/receiving-related operations of a terminal device side in the foregoing method embodiments, and the processor 1301 is configured to perform processing-related operations of the terminal device side in the foregoing method embodiments.

For example, the communication interface 1303 is configured to receive a first message from a network device, where the first message is for indicating a second BWP, a terminal device camps on a first bandwidth part BWP, and the terminal device is in a non-connected state. The processor 1301 is configured to switch from the first BWP to the second BWP. Other specific details are similar to corresponding descriptions in FIG. 12, and details are not described herein again.

In another example, the apparatus 1300 is configured to implement operations performed by the network device in the foregoing method embodiments. The communication interface 1303 is configured to perform sending/receiving-related operations of a network device side in the foregoing method embodiments, and the processor 1301 is configured to perform processing-related operations of the network device side in the foregoing method embodiments.

For example, the processor 1301 is configured to generate a first message. The communication interface 1303 is configured to send the first message to a terminal device, where the terminal device camps on a first bandwidth part BWP, the terminal device is in a non-connected state, and the first message is for indicating the terminal device to switch from the first BWP to a second BWP.

Optionally, the communication interface 1303 is further configured to send or receive small data or a reference signal to the terminal device on the second BWP. Other specific details are similar to corresponding descriptions in FIG. 12, and details are not described herein again.

Further, at least one embodiment further provides an apparatus. The apparatus is configured to perform the method on the terminal device side or the method on the network device side in the foregoing method embodiments. A computer-readable storage medium including a program is provided. In response to the program being run by a processor, the method on the terminal device side or the method on the network device side in the foregoing method embodiments is performed. A computer program product including computer program code is provided. In response to the computer program code being run on a computer, the computer is caused to implement the method on the terminal device side or the method on the network device side in the foregoing method embodiments. A chip is provided, including a processor, where the processor is coupled to a memory, the memory is configured to store a program or instructions, and when the program or the instructions are executed by the processor, an apparatus is caused to perform the method on the terminal device side or the method on the network device side in the foregoing method embodiments. A system is provided, including the terminal device and the network device in the foregoing method embodiments.

In at least one embodiment, the processor is a general-purpose processor, a digital signal processor, an application-specific integrated circuit, a field programmable gate array or another programmable logic device, a discrete gate or transistor logic device, or a discrete hardware component, and implements or performs the methods, steps, and logical block diagrams disclosed at least one embodiment. The general-purpose processor is a microprocessor, or is any conventional processor. The steps of the method disclosed with reference to at least one embodiment is directly performed by a hardware processor, or is performed by a combination of hardware and software modules in a processor.

In at least one embodiment, the memory is a non-transitory memory, for example, a hard disk drive (hard disk drive, HDD) or a solid-state drive (solid-state drive, SSD), or is a transitory memory (transitory memory), for example, a random access memory (random access memory, RAM). The memory is any other medium that carries or store expected program code in a form of an instruction structure or a data structure and that is accessed by a computer, but is not limited thereto. The memory in at least one embodiment is alternatively a circuit or any other apparatus that implements a storage function, and is configured to store program instructions and/or data.

All or some of the methods at least one embodiment are implemented through software, hardware, firmware, or any combination thereof. In response to the methods being implemented through software, all or some of the methods are implemented in a form of a computer program product. The computer program product includes one or more computer instructions. In response to the computer program instructions being loaded and executed on a computer, the procedure or functions according to at least one embodiment are all or partially generated. The computer is a general-purpose computer, a dedicated computer, a computer network, a network device, user equipment, or another programmable apparatus. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium is any usable medium accessible by a computer, or a data storage device, for example, a server or a data center, integrating one or more usable media. The usable medium is a magnetic medium (for example, a floppy disk, a hard disk, or a magnetic tape), an optical medium (for example, a digital video disc (digital video disc, DVD for short)), a semiconductor medium (for example, an SSD), or the like.

A person skilled in the art is able to make various modifications and variations without departing from the scope of embodiments described herein. Embodiments described herein are intended to cover these modifications and variations provided that they fall within the scope defined by the claims and their equivalent technologies.

What is claimed is:

1. An apparatus, wherein the apparatus is a terminal device or is applied to the terminal device, and the apparatus comprising:

one or more processors; and a memory having instructions stored thereon that, when executed by the one or more processors, cause the one or more processors to:

camp on a first bandwidth part (BWP) in response to being in a radio resource control (RRC)-non-connected state;

receive a first message from a network device, wherein the first message is for indicating a second BWP;

receive a second message from the network device for configuring the second BWP; and within a predetermined time period, switch from the first BWP to the second BWP configured according to the second message.

2. The apparatus according to claim 1, wherein the first message is carried in downlink control information (DCI), and the DCI is first-type DCI, wherein the DCI is scrambled by a paging radio network temporary identifier (P-RNTI) or is scrambled by a system information radio network temporary identifier (SI-RNTI); or the DCI is second-type DCI, including a physical downlink control channel (PDCCH) order, wherein the DCI is useable for scheduling a physical downlink shared channel (PDSCH), for scheduling a random access response, or for scheduling an acknowledgment (ACK)/negative acknowledgment (NACK) feedback for a configured grant (CG).

3. The apparatus according to claim 1, wherein the first message is carried in a physical downlink shared channel (PDSCH), and the PDSCH is useable for carrying at least one of following information: information for paging, system information, a random access response, an acknowledgment (ACK)/negative acknowledgment (NACK) feedback for a configured grant (CG), or downlink small data.

4. The apparatus according to claim 1, wherein the first message is useable for indicating at least one of following content:

an identifier of the second BWP, information about the terminal device that uses BWP switching, a type of the terminal device that uses BWP switching, a BWP switch period, a cell corresponding to the second BWP, or a resource for small data communication in the second BWP.

5. The apparatus according to claim 1, wherein the one or more processors are further configured to:

receive the second message from the network device, wherein the second message is useable for configuring a plurality of BWPs, and the plurality of BWPs include the second BWP.

6. The apparatus according to claim 5, wherein the second message includes an RRC release message, system information, or a message carried in a physical downlink shared channel (PDSCH).

7. The apparatus according to claim 5, wherein the second message is useable for indicating at least one of following content in each of the one or more BWPs:

an identifier of the BWP;

a measurement parameter;

a BWP switch period;

use of the BWP for uplink and/or downlink transmission; or a time-frequency resource for small data transmission in the BWP.

8. The apparatus according to claim 1, wherein the first message is further useable for indicating at least one of following content in the second BWP:

an identifier of the BWP;

a measurement parameter;

a BWP switch period;

use of the BWP for at least one of uplink transmission or downlink transmission;

a time-frequency resource for small data transmission in the BWP; or a cell corresponding to the BWP.

9. An apparatus, comprising:

one or more processors; and a memory having instructions stored thereon that, when executed by the one or more processors, cause the one or more processors to:

send a first message to a terminal device, wherein the first message is for indicating a second BWP; and send a second message to the terminal device for configuring the second BWP:

wherein the first message is useable for indicating to the terminal device in a radio resource control (RRC)-non-connected state to switch within a predetermined time period from a first BWP to the second BWP configured according to the second message.

10. The apparatus according to claim 9, wherein the one or more processors execute the instructions to further caused the one or more processors to:

receive small data or a reference signal from the terminal device on the second BWP.

11. The apparatus according to claim 9, wherein the first message is carried in downlink control information (DCI), and the DCI is a first-type DCI, wherein the first-type DCI is scrambled by a paging radio network temporary identifier (P-RNTI) or scrambled by a system information radio network temporary identifier (SI-RNTI); or the DCI is second-type DCI, wherein the second-type DCI includes a physical downlink control channel (PDCCH) order, DCI scheduling a physical downlink shared channel (PDSCH), DCI scheduling a random access response, or DCI scheduling an acknowledgment (ACK)/negative acknowledgment (NACK) feedback for a configured grant (CG).

12. The apparatus according to claim 9, wherein the first message is carried in a physical downlink shared channel (PDSCH), and the PDSCH is useable for carrying at least one of following information: information for paging, system information, a random access response, an acknowledgment (ACK)/negative acknowledgment (NACK) feedback for a configured grant (CG), or downlink small data.

13. The apparatus according to claim 9, wherein the first message is useable for indicating at least one of following content:

an identifier of the second BWP, information about the terminal device that uses BWP switching, a type of the terminal device that uses BWP switching, a BWP switch period, a cell corresponding to the second BWP, or a resource for small data communication in the second BWP.

14. The apparatus according to claim 9, wherein the one or more processors are further caused to:

send the second message to the terminal device, wherein the second message is useable for configuring a plurality of BWPs for the terminal device, and the plurality of BWPs include the second BWP.

15. A method, comprising:

sending a first message to a terminal device, wherein the first message is for indicating a second BWP; and sending a second message to the terminal device for configuring the second BWP:

wherein the first message is useable for indicating to the terminal device in a radio resource control (RRC)-non-connected state to switch within a predetermined time period from a first BWP to the second BWP configured according to the second message.

16. The method according to claim 15, further comprising:

receiving small data or a reference signal from the terminal device on the second BWP.

17. The method according to claim 15, wherein the first message is carried in downlink control information (DCI), and the DCI is first-type DCI, wherein the first-type DCI is scrambled by a paging radio network temporary identifier (P-RNTI) or scrambled by a system information radio network temporary identifier (SI-RNTI); or the DCI is second-type DCI, wherein the second-type DCI includes a physical downlink control channel (PDCCH) order, DCI scheduling a physical downlink shared channel (PDSCH), DCI scheduling a random access response, or DCI scheduling an acknowledgment (ACK)/negative acknowledgment (NACK) feedback for a configured grant (CG).

18. The method according to claim 15, wherein the first message is carried in a physical downlink shared channel (PDSCH), and the PDSCH is useable for carrying at least one of following information: information for paging, system information, a random access response, an acknowledgment (ACK)/negative acknowledgment (NACK) feedback for a configured grant (CG), or downlink small data.

19. The method according to claim 15, wherein the first message is useable for indicating at least one of following content:

an identifier of the second BWP, information about the terminal device that uses BWP switching, a type of the terminal device that uses BWP switching, a BWP switch period, a cell corresponding to the second BWP, or a resource for small data communication in the second BWP.

20. The method according to claim 15:

wherein the sending the second message to the terminal device includes sending the second message useable for configuring a plurality of BWPs for the terminal device, and the plurality of BWPs include the second BWP.

* * * * *